US012720162B2

(12) United States Patent
Dice et al.

(10) Patent No.: US 12,720,162 B2
(45) Date of Patent: Aug. 25, 2026

(54) DIGITAL VIDEO ALARM SITUATIONAL MONITORING COMPUTER SYSTEM

(71) Applicant: Dice Corporation, Bay City, MI (US)

(72) Inventors: Clifford V. Dice, Midland, MI (US); Gerald L. Corrion, Bay City, MI (US); Kevin P. Kilborn, Bay City, MI (US)

(73) Assignee: Dice Corporation, Bay City, MI (US)

( * ) Notice: Subject to any disclaimer, the term of this patent is extended or adjusted under 35 U.S.C. 154(b) by 243 days.

(21) Appl. No.: 18/212,952

(22) Filed: Jun. 22, 2023

(65) Prior Publication Data

US 2023/0334976 A1 Oct. 19, 2023

Related U.S. Application Data

(63) Continuation of application No. 17/232,247, filed on Apr. 16, 2021, now Pat. No. 11,790,764.

(51) Int. Cl.
*H04N 21/472* (2011.01)
*G06F 3/04817* (2022.01)
(Continued)

(52) U.S. Cl.
CPC ....... *H04N 21/472* (2013.01); *G06F 3/04817* (2013.01); *G06F 3/0482* (2013.01); (Continued)

(58) Field of Classification Search
CPC ................. G08B 27/005; G08B 21/22; G08B 13/19602; G06F 3/04817; H04N 7/181; (Continued)

(56) References Cited

U.S. PATENT DOCUMENTS 6,400,265 B1 6/2002 Saylor et al.
6,445,774 B1 9/2002 Kidder et al.
(Continued)

FOREIGN PATENT DOCUMENTS

CN 103747211 A 4/2014
CN 107205160 A 9/2017
(Continued)

OTHER PUBLICATIONS

Macmost, "How To Select Multiple Files On A Mac", (Jan. 21, 2020), <URL: https://macmost.com/how-to-select-multiple-files-on-a-mac.html/>, p. 1-7 (Year: 2020).*

*Primary Examiner* — Mong-Shune Chung
(74) *Attorney, Agent, or Firm* — Brooks Kushman P.C.

(57) ABSTRACT

A digital video alarm situational monitoring computer system includes an alarm monitoring computer having non-transitory memory configured to store machine instructions that are to be executed by the computer. The machine instructions when executed by the computer implement the following functions: receiving a first digital video clip associated with a first digital video alarm event and a second digital video associated with a second digital video alarm event; displaying a first icon of the first digital video alarm event and a second icon of the second digital video alarm event on a graphical user interface; and simultaneously playing the first digital video clip and the second digital video clip on the graphical user interface.

20 Claims, 21 Drawing Sheets

(51) Int. Cl.
*G06F 3/0482* (2013.01)
*G08B 27/00* (2006.01)
*H04N 7/18* (2006.01)
*H04N 21/2365* (2011.01)
*H04N 21/482* (2011.01)
*G08B 21/22* (2006.01)

(52) U.S. Cl.
CPC ........... *G08B 27/005* (2013.01); *H04N 7/181* (2013.01); *H04N 21/2365* (2013.01); *H04N 21/482* (2013.01); *G08B 21/22* (2013.01)

(58) Field of Classification Search
CPC .. H04N 7/188; H04N 21/2365; H04N 21/472; G05B 19/00
See application file for complete search history.

(56) References Cited

U.S. PATENT DOCUMENTS 6,829,371 B1 12/2004 Nichani et al.
6,977,585 B2 12/2005 Falk et al.
7,003,719 B1 2/2006 Rosenoff et al.
7,984,179 B1 7/2011 Huang
8,780,199 B2 7/2014 Mimar
9,313,556 B1 4/2016 Borel et al.
9,740,941 B2 8/2017 Bae et al.
10,007,261 B2 6/2018 Van Camp
10,319,202 B2 6/2019 Yau et al.
10,347,103 B2 7/2019 Hicks, III
10,389,971 B2 8/2019 Arora
10,720,188 B2 7/2020 Elsner
10,732,962 B1 8/2020 Florescu
10,891,509 B2 1/2021 Doumbouya et al.
11,158,177 B1 10/2021 Elhattab et al.
2002/0054211 A1 5/2002 Edelson et al.
2003/0025599 A1 2/2003 Monroe
2003/0052986 A1 3/2003 Matsumoto
2004/0024688 A1 2/2004 Bi et al.
2005/0128295 A1 6/2005 Addy
2005/0146606 A1 7/2005 Karsenty et al.
2006/0117356 A1 6/2006 Jojic et al.
2006/0170769 A1 8/2006 Zhou
2006/0192675 A1 8/2006 Renkis
2006/0221184 A1 10/2006 Vallone et al.
2007/0219843 A1 9/2007 Keeler et al.
2008/0022199 A1* 1/2008 Sako ....................... G06F 16/54 715/273
2008/0022335 A1 1/2008 Yousef
2008/0024610 A1 1/2008 Konishi
2009/0141939 A1 6/2009 Chambers et al.
2010/0088646 A1 4/2010 Nishimori et al.
2010/0107126 A1 4/2010 Lin et al.
2010/0123908 A1 5/2010 Denoue et al.
2011/0169631 A1 7/2011 Sheu et al.
2011/0247084 A1 10/2011 Kolbert et al.
2012/0054615 A1 3/2012 Lin et al.
2013/0039543 A1 2/2013 Fuhr et al.
2013/0091432 A1* 4/2013 Shet ........................ G06F 16/73 715/719
2014/0043480 A1 2/2014 Wu
2015/0067460 A1 3/2015 Beaumont
2015/0116499 A1* 4/2015 Worrill ..................... H04N 5/76 348/159
2015/0242597 A1 8/2015 Danciu
2015/0350611 A1 12/2015 Pearson et al.
2016/0071403 A1 3/2016 Vaidhyanatan et al.
2016/0094805 A1 3/2016 Wang et al.
2016/0155003 A1 6/2016 Venetianer et al.
2016/0173959 A1 6/2016 Seema et al.
2016/0182834 A1 6/2016 Sivasankaran
2016/0364616 A1* 12/2016 Mclean ................. G06F 3/0346
2016/0366118 A1 12/2016 Wang
2017/0185277 A1 6/2017 Sundermeyer et al.
2018/0018081 A1 1/2018 Dattilo-Green et al.
2018/0113577 A1 4/2018 Burns et al.
2018/0115788 A1 4/2018 Burns et al.
2018/0151041 A1 5/2018 Hicks, III
2018/0167591 A1* 6/2018 Maliuk .................. G06V 20/52
2018/0232592 A1 8/2018 Stewart et al.
2018/0242044 A1 8/2018 Zhao et al.
2018/0338120 A1* 11/2018 Lemberger ............. G06V 20/41
2019/0068916 A1 2/2019 Arora
2019/0174089 A1 6/2019 Chen et al.
2019/0271774 A1 9/2019 Zhang et al.
2019/0289263 A1 9/2019 Amini et al.
2019/0295392 A1 9/2019 Johan et al.
2020/0014885 A1 1/2020 Carey
2020/0374333 A1 11/2020 Racz et al.
2021/0248888 A1 8/2021 Will et al.
2021/0314530 A1 10/2021 Carey
2021/0368137 A1 11/2021 Alcantara et al.
2021/0409656 A1 12/2021 Imes
2022/0076024 A1* 3/2022 Walker ............... G06V 10/7625
2022/0172586 A1 6/2022 San Pedro et al.
2022/0277642 A1 9/2022 Fukushima et al.
2022/0295008 A1 9/2022 Nold et al.
2022/0335815 A1 10/2022 Dice et al.

FOREIGN PATENT DOCUMENTS

CN 109922303 A 6/2019
CN 107959885 B 5/2020
GB 2532848 B 6/2019
KR 20040067379 A 7/2004

* cited by examiner

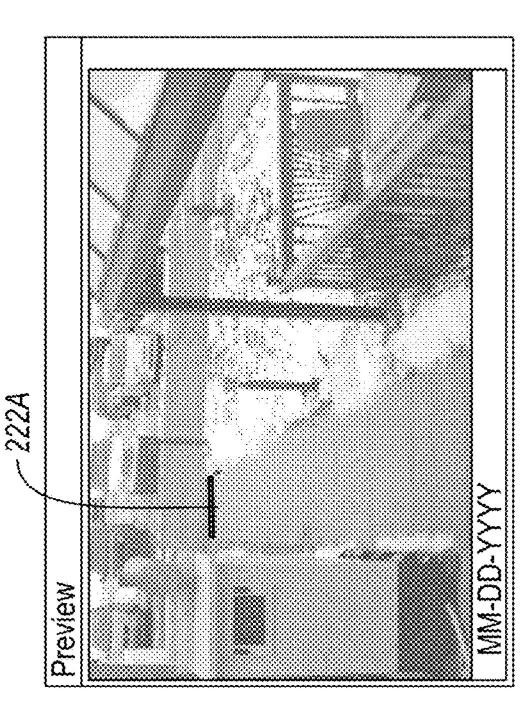
FIG. 3D
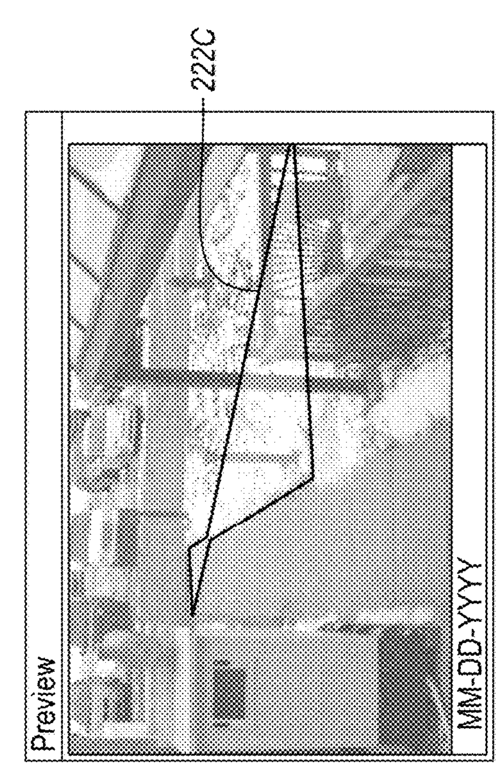
FIG. 3F
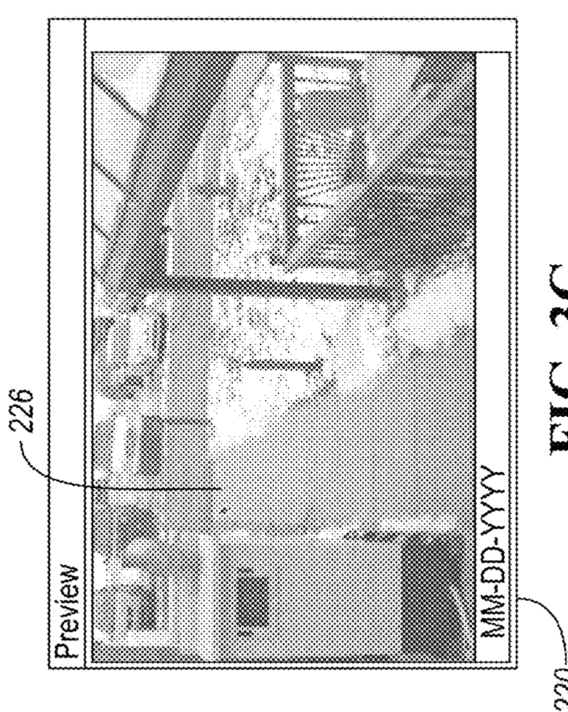
FIG. 3C
222B
Preview
MM-DD-YYYY
FIG. 3E Alarm Actions Account Number: 00DICE
Company Name: DICE CORPORATION
Address: 1410 S VALLEY CENTER DRIVE BAY CITY MI 48706

*Click on a screenshot to view the associated video*

| Site Time | Details | |
|---|---|---|
| 10/06/2020 14:42 | SIGNAL RECEIVED: (E130)<br>E130 B A<br>BURGLARY AREA A ZONE B | |
| 10/06/2020 15:06 | Created screenshot from<br>10/06/2020 14:44 event | 714 |
| 10/06/2020 15:06 | Created screenshot from<br>10/06/2020 14:49 event | 716 |
| 10/06/2020 15:06 | Created screenshot from<br>10/06/2020 14:49 event | 718 |

DIGITAL VIDEO ALARM SITUATIONAL MONITORING COMPUTER SYSTEM

CROSS-REFERENCE TO RELATED APPLICATIONS

This application is a continuation of U.S. application Ser. No. 17/232,247, filed Apr. 16, 2021, and issued as U.S. Pat. No. 11,790,764 on Oct. 17, 2023, the disclosure of which is incorporated in its entirety by reference herein.

TECHNICAL FIELD

This invention relates to a digital video alarm situational monitoring computer system for use in alarm security computer systems and other web-based systems.

BACKGROUND

Alarm monitoring computer systems have been developed and implemented. These computer systems are configured to receive digital and/or analog signals that potentially relate to an alarm event. The received signals may be received from sensors and/or detectors, including without limitation, motion detectors (e.g. passive infrared motion detectors), smoke detectors, sound detectors, breakage detectors (e.g. glass break detectors), temperature detectors, ultrasonic detectors, microwave detectors, magnetic switches, and photoelectric beams. The received signals are processed by alarm monitoring computer systems to determine whether an alarm event has occurred. If an alarm event has occurred, the alarm monitoring computer system is configured to determine a course of action based on the occurrence of the alarm event and an alarm event type associated with the alarm event. Non-limiting examples of alarm event types include fire alarms, burglary alarms, and intrusion alarms. Alarm monitoring computer systems have limited capabilities regarding the use of digital video.

SUMMARY

In one embodiment, a digital video alarm situational monitoring computer system is disclosed. The digital video alarm situational monitoring computer system includes an alarm monitoring computer having non-transitory memory configured to store machine instructions that are to be executed by the computer. The machine instructions when executed by the computer implement the following functions: receiving a first digital video clip associated with a first digital video alarm event and a second digital video associated with a second digital video alarm event; displaying a first icon of the first digital video alarm event and a second icon of the second digital video alarm event on a graphical user interface; and simultaneously playing the first digital video clip and the second digital video clip on the graphical user interface.

In another embodiment, a digital video alarm situational monitoring computer system. The digital video alarm situational monitoring computer system includes an alarm monitoring computer having non-transitory memory configured to store machine instructions that are to be executed by the computer. The machine instructions when executed by the computer implement the following function: receiving a first digital video clip associated with a first digital video alarm event and a second digital video clip associated with a second digital video alarm event. The first and second digital video clips are recorded by a first network digital video camera. The machine instructions when executed by the computer implement the following further functions: displaying a first icon of the first digital video alarm event and a second icon of the second digital video alarm event on a graphical user interface; receiving a single camera input selecting both of the first and second icons; and simultaneously playing the first digital video clip and the second digital video clip on the graphical user interface in response to receiving the single camera input.

In yet another embodiment, a digital video alarm situational monitoring computer system is disclosed. The digital video alarm situational monitoring computer system includes an alarm monitoring computer having non-transitory memory configured to store machine instructions that are to be executed by the computer. The machine instructions when executed by the computer implement the following function: receiving a first digital video clip associated with a first digital video alarm event and a second digital video clip associated with a second digital video alarm event. The first digital video clip is recorded by a first network digital video camera. The second digital video clip is recorded by a second network digital video camera. The machine instructions when executed by the computer implement the following further functions: displaying a first icon of the first digital video alarm event and a second icon of the second digital video alarm event on a graphical user interface; receiving a single timeline input selecting both of the first and second icons; and simultaneously playing the first digital video clip and the second digital video clip on the graphical user interface in response to receiving the single timeline input.

BRIEF DESCRIPTION OF THE DRAWINGS

FIGS. 3C through 3J depict a sequence of cursor movements selected to create boundary lines to form a region of interest in accordance with an embodiment.

FIG. 7B depicts an electronic report associated with several digital video alarm events.

DETAILED DESCRIPTION

Figure 1:
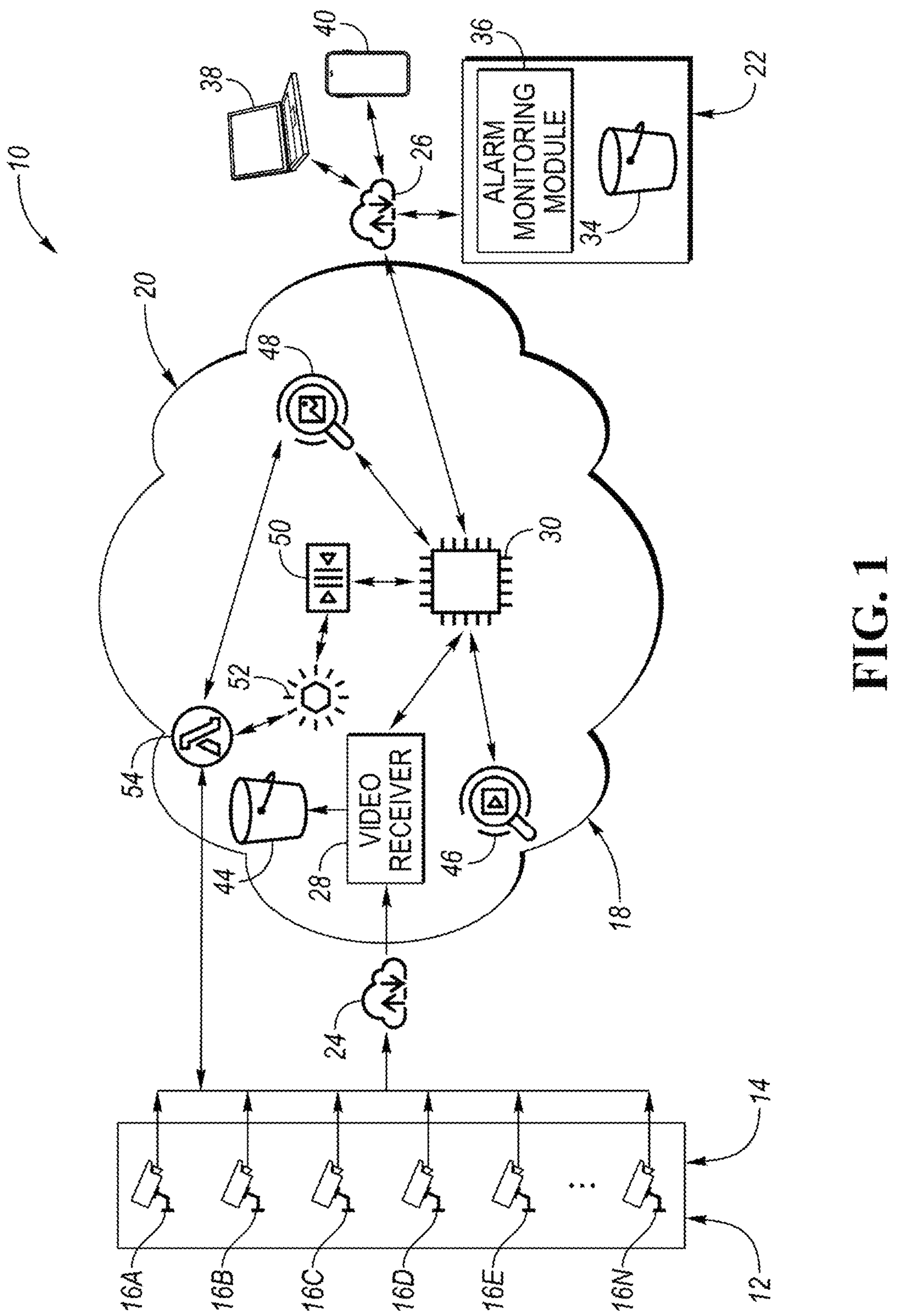
FIG. 1 depicts a system architecture for a digital video alarm monitoring computer system according to one embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Alarm monitoring computer systems have been developed and implemented. These computer systems are configured to receive digital and/or analog signals that potentially relate to an alarm event. The received signals may be received from sensors and/or detectors, including without limitation, motion detectors (e.g. passive infrared motion detectors), smoke detectors, sound detectors, breakage detectors (e.g. glass break detectors), temperature detectors, ultrasonic detectors, microwave detectors, magnetic switches, and photoelectric beams. The received signals are processed by the alarm monitoring computer systems to determine whether an alarm event has occurred. If an alarm event has occurred, the alarm monitoring computer system is configured to determine a course of action based on the occurrence of the alarm event and an alarm event type associated with the alarm event. Non-limiting examples of alarm events include fire alarms, burglary alarms, and intrusion alarms. Alarm monitoring computer systems have limited capabilities regarding the use of digital video.

The alarm signals received by an alarm monitoring computer system have a relatively small file size, thereby permitting time and cost-efficient transmission and processing of the alarm signals to the alarm monitoring computer system. Traditional alarm monitoring computer systems have attempted to apply digital video data within alarm monitoring computer systems in a very limited manner. Sources of digital video data are suitable for transmitting large amounts of data associated with the digital video. For instance, network video recorders (NVRs) and digital video recorders (DVRs) are examples of devices configured to transmit digital video data. An NVR is a software application that records digital video data on a digital medium. NVRs are typically executed on a dedicated computer device embedded with a digital medium configured to store the NVR and recorded video data, and a processor to execute the NVR. A DVR is a hardware device that records video data on a digital medium included on the hardware device. While NVRs connect directly to a video capture camera or tuner, a DVR is connected to a network. A DVR encodes video data while an NVR receives processed and encoded video data for a network camera. NVRs and DVRs may be used in video surveillance systems. Interfacing these video surveillance systems with alarm monitoring computer systems has proven difficult and has failed to provide adequate synergy between the video surveillance systems and the alarm monitoring computer systems.

The transmission of such large amounts of data associated with digital video may be expensive due to cellular fees and/or other related fees and the transmission may be difficult in network computer systems that do not have adequate bandwidth. Also, storage of digital video data within the alarm monitoring system may become an issue due to the amount of data associated with digital video. It is also difficult for an alarm monitoring computer system to consume and analyze such large amounts of digital video data. For instance, only a small fraction of the digital video data may be related to an alarm signal and a potential alarm event. The rest of the digital video data may not be associated with the alarm signals and alarm events (in certain circumstances referred to as noise), this slows down the functioning of the alarm monitoring computer system.

Accordingly, use of digital video data as an input into alarm monitoring computer systems has failed to provide adequate functionality.

Considering the foregoing, what is needed is a digital video alarm monitoring computer system that can facilitate timely and cost-efficient use of data associated with digital video as alarm signals. What is also needed is a digital video alarm monitoring computer system where the system is not overloaded with noise. What is further needed is a digital video alarm monitoring computer system that selectively manages the storage of digital video data such that only digital video data that is related to alarm signals and/or alarm events is stored. One or more embodiments include one or more of the benefits identified herein and addresses one or more of the problems and/or drawbacks identified herein.

FIG. 1 depicts a system architecture for digital video alarm monitoring computer system 10 according to one embodiment. Digital video alarm monitoring computer system 10 is configured to monitor digital video data in relation to potential alarm events. The digital video data may include one or more digital video frames and digital video clips comprised of several digital video frames. Each digital video frame may be a digital image composed of pixels. Each pixel may be defined by a discrete quantity of numerical representations of the pixel's intensity and/or gray level. These discrete quantities are associated with a spatial two-dimensional coordinate system. A digital image may be a raster image, otherwise referred to as a bitmap digital image. A bitmap digital image may be a raster of pixels where each pixel has a property of color. The color of a pixel may be represented by a fixed number of bits. A digital image may also be a vector image. Digital video clips may be a series of sequential, digital images configured to be displayed in rapid succession. Each of the digital images may be referred to as a digital video frame. The rate at which the digital video frames are displayed may be referred to as a frame rate, which can be measured in frames per second. Digital video data may be associated with and correlated with digital audio to create digital video content. Digital audio is a representation of sound recorded in or converted into digital form.

As shown in FIG. 1, digital video alarm monitoring computer system 10 includes client network 12 residing at client site 14. The client network 12 may be a physical network located at client site 14 and may be referred to as an on-premises server. Digital video alarm monitoring computer system 10 also includes digital video analytics server 18 virtually residing on cloud instance 20. Cloud instance 20 may be facilitated by a cloud server. The cloud server may have a computing infrastructure that can be physical, virtual, or a combination thereof. The cloud server may be configured with processing power to handle complicated operations and storage for large volumes of data. In one or more embodiments, digital video analytics server 18 has a greater amount of processing capability and data storage capacity than on-premises client network 12. Digital video alarm monitoring computer system 10 also includes alarm monitoring server 22. Digital video analytics server 18 and client network 12 are configured to communicate with each other over first external communication network 24. Digital video analytics server 18 and alarm monitoring server 22 are configured to communicate with each other over second external communication network 26. While digital video analytics server 18 is shown as a cloud-based server on FIG. 1, in other embodiments, digital video analytics server 18 may be implemented as an on-premises server based on the functionality being implemented. While client network 12 is shown as a on-premises server, in other embodiments, client network 12 may be implemented as a cloud-based server based on the functionality being implemented. Alarm monitoring server 22 may be an on-premises server or a cloud-based server depending on the implementation. In the embodiment shown in FIG. 1, client network 12, digital video analytics server 18 and alarm monitoring server 22 are separate and distinct networks and servers.

As shown in FIG. 1, client network 12 resides at client site 14. Client network 12 can be configured to obtain digital video data depicting different views of client site 14. Client site 14 can be a site that is monitored for alarm events. Non-limiting examples of client site 14 include vehicle dealerships, construction sites, department stores, personal residences, office buildings, and manufacturing facilities. In one or more embodiments, client network 12 obtains digital video data depicting different views of client site 14 and selectively transmits the digital video data to digital video analytics server 18, which is configured to analyze the digital video data.

As shown in FIG. 1, digital video analytics server 18 virtually resides on cloud instance 20. In other embodiments, digital video analytics server 18 resides on premises. Digital video analytics server 18 may include modules to characterize, identify and/or prioritize digital video data. For instance, digital video analytics server 18 may be configured to determine whether to analyze and/or permanently store digital video data from client network 12 based on data associated with the digital video. In one or more embodiments, the associated data is not the actual digital video but data that identifies the digital video. The identifying data may be examined by digital video analytics server 18 to determine whether the digital video itself should be analyzed and/or permanently stored by digital video analytics server 18. Digital video analytics server 18 may also include one or more modules that selectively analyze digital video received from client network 12. The analysis may be performed to determine data indicative of an alarm event. For instance, data indicative of an alarm event may be motion and/or object detection associated with the digital video data. The motion and/or object detection data and/or the related digital video data may be transmitted to alarm monitoring server 22, which is configured to process the data indicative of the alarm event. In one or more embodiments, digital video analytics server 18 does not perform any activities relating to processing the alarm event data other than transmitting the alarm event data to alarm monitoring server 22. In such embodiments, alarm monitoring server 22 is configured to process the alarm event data indicative of the alarm event. For instance, the alarm event data indicative of the digital video alarm event may be processed to determine a prioritization of the digital video alarm event and/or an identification of the alarm event type.

As shown in FIG. 1, alarm monitoring module 36 resides on alarm monitoring server 22. Alarm monitoring module 36 is in communication with alarm monitoring database 34. In one or more embodiments, alarm monitoring module 36 is configured to determine one or more activities to be performed to process digital video alarm event data indicative of a digital video alarm event. The alarm event data may include an analytics tag. The analytics tag may include the output of motion and/or object detection analysis performed by digital video analytics server 18 on the motion and/or object detection data. Alarm monitoring module 36 may be configured to receive one or more operator selected analytics tags. Alarm monitoring module 36 may also be configured to configure one or more operator defined analytics tags. For instance, digital video frames associated with a user defined analytics tag may be transmitted to an object detection algorithm to train the object detection algorithm. For instance, if camouflage is not a pre-determined analytics tag, then the object detection algorithm can be trained to detect camouflage in response to analyzing several digital video frames including camouflage.

Non-limiting examples of analytics tags include a vehicle or a human being. Other non-limiting examples of analytics tags include vehicles such as passenger car, truck, and heavy machinery; human behavior such as arguing, agitation, and violent motions; clothing such as face masks, scarfs, ski masks, camouflage, combat uniform, and bullet proof vest; firearms such as long guns and short guns; and animals such as horses, goats, dogs and cats. The analytics tag may be associated with whether a mask is covering the mouth and nose of a human wearing the mask.

An analytics tag may be characterized in a class of analytics tags. Non-limiting examples of analytics tags classes include people and events, food and drink, nature and outdoors, animals and pets, home and garden, sports and leisure, plants and flowers, art and entertainment, transportation and vehicles and electronics. Non-limiting examples of analytics tags in the people and events analytics tags class include wedding, bride, baby, birthday cake, and guitarist. Non-limiting examples of analytics tags in the food and drink analytics tags class include apple, sandwich, wine, cake, and pizza. Non-limiting examples of analytics tags in the nature and outdoors analytics tags class include beach, mountains, lake, sunset, and rainbow. Non-limiting examples of analytics tags in the animals and pets analytics tags class include dog, cat, horse, tiger and turtle. Non-limiting examples of analytics tags in the home and garden analytics tags class include bed, table, backyard, chandelier, and bedroom. Non-limiting examples of analytics tags in the sports and leisure analytics tags class include golf, basketball, hockey, tennis, and hiking. Non-limiting examples of analytics tags in the plants and flowers analytics tags class include rose, tulip, palm tree, forest and bamboo. Non-limiting examples of analytics tags in the art and entertainment analytics tags class include sculpture, painting, guitar, ballet, and mosaic. Non-limiting examples of analytics tags in the transportation and vehicles analytics tags class include airplane, car, bicycle, motorcycle, and truck. Non-limiting examples of analytics tags in the electronics analytics tags class include computer, mobile phone, video camera, television, and headphones.

The analytics tag can be user selected by the client using functionality on digital video analytics server 18. Each analytics tag may be associated with a video alarm signal. The analytics tag may be part of the alarm event data indicative of the digital video alarm event. This association may be made through alarm monitoring module 36. First and second analytics tags may be associated with the same type of video alarm signal. First and second analytics tags may have different types of digital video alarm signals. Non-limiting examples of digital video alarm signals include alpha numeric codes. For instance, human being may be E750 and vehicle may be E751.

Alarm monitoring module 36 may be configured to perform one or more actions based on the video alarm signal associated with the receipt of data indicative that an alarm event is associated with an analytics tag. These actions may differ based on the zone relating to the data indicative of the alarm event. In one or more embodiments, the presence of an analytics tag is determined by digital video analytics server 18 by analyzing digital video data received from client network 12. In one or more of these embodiments, alarm monitoring server 22, including alarm monitoring module 36, does not perform the analysis of such digital video for the presence of an analytics tag. In such embodiments, the digital video data itself (i.e. digital video frames or digital video clips) are not transmitted to alarm monitoring server 22 for this purpose. Rather, the resulting analytics tag is transmitted to alarm monitoring server 22. In such embodiments, relatively less digital video data is received and processed by alarm monitoring server 22, where such digital video data may be more efficiently and accurately analyzed (e.g. analyzed for object and/or motion detection) by digital video analytics server 18. However, this embodiment does not preclude transmitting the digital video data itself from digital video analytics server 18 to alarm monitoring server 22 for other purposes. For instance, selectively transmitting digital video frames or clips to alarm monitoring server 22 is pertinent to the analytics tag determination for display to a user through alarm monitoring module 36.

Alarm monitoring module 36 is in communication with user computer 38 (e.g. desktop or notebook computer) and user mobile device 40 (e.g. smart phone) via second external communication network 26. User computer 38 and/or user mobile device 40 may be used by a subscriber to access and to execute functionality stored in computer instructions on alarm monitoring module 36 and/or alarm monitoring database 34. User computer 38 and/or user mobile device 40 may be associated with or reside at client site 14. User computer 38 and/or user mobile device 40 may be connected to client network 12.

Client network 12 includes network cameras 16A through 16N. While FIG. 1 depicts client network 12 having six (6) network cameras, the number of network cameras may only be limited by hardware specifications and/or operating system limitations. The number of network cameras may be about 100 when relatively low powered network cameras are utilized. Zones can be defined within client site 14 and one or more network cameras may be associated with one or more zones. For instance, a first zone may be associated with a first network camera configured to display a first view of the zone and a second network camera configured to display a second view of the zone. Each zone may be a different physical area at client site 14. For instance, if the client site 14 is an office building, the zones could include front door, rear door, loading dock, main hallway, conference room, and lunchroom. A zone may also be a point of contact at client site 14. For instance, a window or a door may be defined as a zone. One or more network cameras may be associated with a point of contact zone. Zones may be associated with specific alarm signals and can be configured to handle specific alarm signals in a specific way. A zone may also be assigned to a subscriber account associated with one or more client sites.

In one embodiment, a network camera includes, without limitation, a lens, an image sensor, a processor, and memory. The memory is configured to store firmware and video data (e.g., video frames and video sequence recordings), sometimes referred to as digital video clips. The firmware includes computer instructions that perform functions when the instructions are executed by the processor. These functions may include, without limitation, networking functions (e.g. transmitting digital video data from a network camera to other destinations on digital video alarm monitoring computer system 10), digital video processing functions and digital video analysis functions.

Client network 12 may also include one or more NVRs (not shown) and one or more DVRs (not shown). An NVR may include a software application that records digital video data from one or more of the network cameras 16A through 16N on a digital medium. The software application on the NVR may also be configured to transmit digital video data from the NVR to cloud server 18 via first external communication network 24. The DVR may also be configured to transmit the digital video data from the DVR to digital video analytics server 18 via first external communication network 24.

Figure 2:
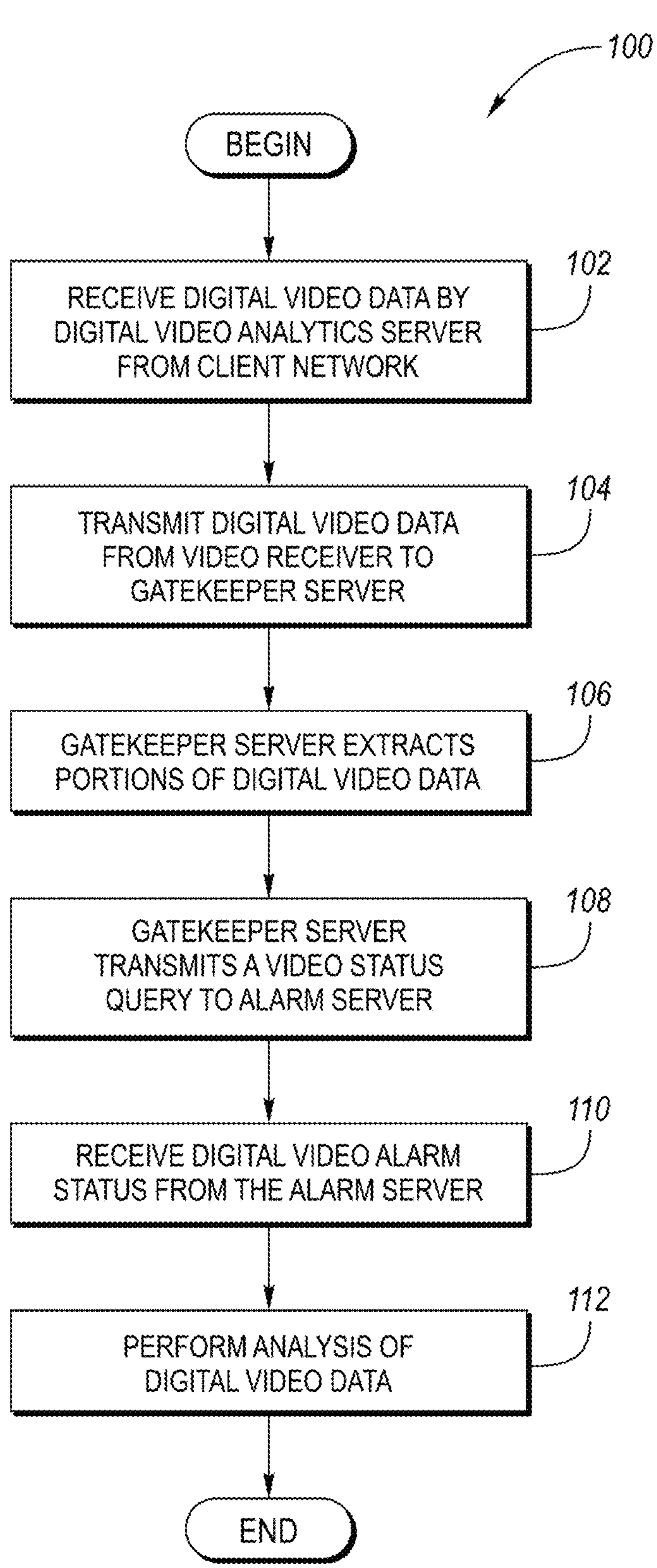
FIG. 2 is a flowchart depicting a series of steps performed by a digital video analytics server according to one embodiment.

FIG. 2 is flowchart 100 depicting a series of steps performed by digital video analytics server 18 according to one embodiment. Although FIG. 2 depicts a certain sequence of the series of steps, the steps may be rearranged and sequenced in a different order depending on the implementation of the embodiment. The steps may also be omitted, modified and added to depending on the implementation of the embodiment.

Flowchart 100 includes step 102. As described in step 102 and with reference to FIG. 1, digital video data is received by digital video analytics server 18 from client network 12 via first external communication network 24. The digital video data may be transmitted directly from one or more network cameras 16A through 16N. The digital video data may be transmitted directly from one or more NVRs and/or DVRs residing on client network 12 and communicating with one or more network cameras 16A through 16N.

The digital video data may be contained in a video data wrapper. The video data wrapper may include a video data header and a video data payload. While the digital video data may be included in the video data payload, the video data header may include identifying information relating to the digital video data. In one embodiment, the identifying data is structured within the video data header. The video data payload may include a digital video clip (e.g. a single file including a sequential series of digital images) and/or one or more digital video frames (e.g. video frames) stored separately within the wrapper. The video data header may include data regarding the video data payload. For instance, the time and date when the digital video clip and/or digital video frames were recorded; the zone associated with the digital video clip and/or digital video frames; a unique identifier associated with a network camera that is recording the digital video clip and/or digital video frames; a name associated with the network camera that is recording the digital video clip and/or digital video frames; a client name or identifier associated with the network camera or client site recording the digital video clip and/or digital video frames; and/or a client site of the network camera recording the digital video clip and/or digital video frames may be included as video header data. In one or more embodiments, the header data may include a camera identifier identifying a network camera and an account number identifying an account associated with the network camera.

The video data wrapper may be associated with a protocol so that the data within the video data wrapper is configured to be stored, retrieved, and read. One protocol that can be used is simple mail transfer protocol (SMTP), which is a communication protocol for electronic mail transmission. Other non-limiting examples of protocols that can be used in connection with the video data wrapper include transmission control protocol/internet protocol (TCP/IP), file transfer protocol (FTP), and hypertext transfer protocol (HTTP). TCP/IP may specify how the data in the video data wrapper is wrapped, addressed, transmitted, routed, and received. FTP may be used for transfer of the video data wrapper between client network 12 and digital video analytics server 18. HTTP may be used to transfer video wrapper data through the World Wide Web.

As shown in FIG. 1, video receiver 28 resides on digital video analytics server 18. Video receiver 28 may be configured to receive at least a portion of a video data wrapper in a specified protocol. In one embodiment, the specified protocol is SMTP and video receiver 28 is an email server. Digital video alarm monitoring computer system 10 may be configured to transmit the video header data of the video data wrapper separately from the video data payload. The video header data may be limited to a very small data size whereas the video data payload is a significantly larger data size as the video data payload includes pixel data of digital video clips and/or frames whereas the identifying data in the video header data may include a limited number of text data fields describing and/or identifying the video clips and/or video frames. The video header data may be encrypted as a token. In one or more embodiments, reducing the data transmission to the video header data reduces the amount of data needed to be transferred by digital video alarm monitoring computer system 10. This may significantly reduce the costs of operating digital video alarm monitoring system 10, especially in those systems where the data is transferred from client network 12 to digital video analytics server 18 using cellular services. In other embodiments, video receiver 28 is configured to receive entire video data wrappers, but only selectively store the video clips and/or video frames to a database or other ROM storage device.

Flowchart 100 of FIG. 2 includes step 104. As described in step 104 and with reference to FIG. 1, digital video data is transmitted from video receiver 28 to gatekeeper server 30. The digital video data may be one or more digital video wrappers where each digital video wrapper includes a video data header and a video data payload.

Flowchart 100 of FIG. 2 includes step 106. As described in step 106 and with reference to FIG. 1, gatekeeper server 30 is configured to extract portions of data from the digital video data received from video receiver 28. In one embodiment, the digital video data may be in the form of a digital video wrapper including a video data header and a digital video payload. Gatekeeper server 30 may be configured to extract the video data header from the digital video wrapper. The video data header may be a text string where characters within the text string may be associated with a data field within the video data header. For instance, the text string within the header data may be token string. The token string may be encrypted and include a camera identifier and an account number. The video header data may be included as a field in an SMTP message (e.g. an email). The field may be a subject line, a to line or in the body of the email. Database 34 and/or 44 may include a look up table of token strings so that alarm monitoring server 22 and/or digital video analytics server 18 can determine the camera and account (as well as other identifying information) associated with the digital video payload. The digital video payload may be sent as attachments in an SMTP message (e.g. an email). After gatekeeper server 30 extracts the data from the video data header, in one or more embodiments, gatekeeper server 30 is configured to parse the video data header to obtain values of one or more data fields within the video data header.

As described in step 108 of FIG. 2 and with reference to FIG. 1, gatekeeper server 30 transmits a video status query to alarm monitoring server 22. In one or more embodiments, the video status query includes data from a video data header. For instance, the data may be identifying data such as, without limitation, the time and date when the digital video clip and/or digital video frames were recorded; the zone associated with the digital video clip and/or digital video frames; a unique identifier associated with a network camera recording the digital video clip and/or digital video frames; a name associated with the network camera recording the digital video clip and/or digital video frames; a client name or identifier associated with the network camera or client site recording the digital video clip and/or digital video frames; and/or a client site of the network camera recording the digital video clip and/or digital video frames. In one or more embodiments, only identifying data in the video data header is transmitted from gatekeeper server 30 to alarm monitoring server 22, and none of the digital video data associated with header data is transmitted to alarm monitoring server 22 in this step of the process. A significantly less amount of data is transmitted when only identifying data in the video data header is transmitted in this step.

The digital video status query requests a digital video alarm monitoring mode from alarm monitoring module 36 of alarm monitoring server 22 in connection with the digital video data associated with the identifying data. The digital video alarm monitoring mode is determined in response to the identifying data included in the digital video alarm monitoring status query. The digital video alarm monitoring mode may be an active monitoring status or an inactive monitoring status. One or more digital video alarm monitoring parameters may be stored in alarm monitoring database 34 associated with a client account. A client account may be associated with each client, client network and/or client site. The one or more digital video alarm monitoring parameters may be used to determine whether the digital video alarm monitoring mode is in an active monitoring status or an inactive monitoring status. The one or more digital video alarm monitoring parameters may include the time and date when the digital video clip and/or digital video frames were recorded, the zone associated with the digital video clip and/or digital video frames, a unique identifier associated with a network camera recording the digital video clip and/or digital video frames, a name associated with the network camera recording the digital video clip and/or digital video frames, a client name or identifier associated with the network camera or client site recording the digital video clip and/or digital video frames, and/or a client site of the network camera recording the digital video clip and/or digital video frames.

As shown in step 110 of FIG. 2 and in connection with FIG. 1, gatekeeper server 30 receives a digital video alarm monitoring mode from alarm monitoring module 36. In the case of an active monitoring status, one or more digital video alarm monitoring parameters may also be received by gatekeeper server 30 from alarm monitoring module 36. In addition to the digital video alarm monitoring parameters identified above, a region of interest may be used as a digital video alarm monitoring parameter. If the digital video alarm monitoring mode is an active monitoring status, then analytics may be performed on the digital video data associated with the active monitoring status as set forth in step 112 of FIG. 2. The analytics may be performed based, in part, on the one or more digital video alarm monitoring parameters received from alarm monitoring module 36. For instance, motion and/or object detection may be performed on the one or more digital video clips and/or the digital video frames. As set forth in one or more embodiments, the performance of object or motion detection may be carried out with an artificial intelligence (AI) module. The analytics may also use data stored in alarm monitoring database 34 associated with region of interest data records that is transmitted by alarm monitoring module 36 to gatekeeper server 30.

The digital video data associated with an active monitoring status may also be stored in digital video database 44. Digital video database 44 may be read only memory (ROM), programmable ROM (PROM), electrically programmable ROM (EPROM), electrically erasable programmable ROM (EEPROM), flash memory and/or other forms of non-volatile or permanent storage. In one or more embodiments, the digital video data is only stored in permanent storage when an active monitoring status is determined. This configuration reduces the amount of permanent storage necessary to implement digital video alarm monitoring computer system 10. In one or more embodiments, step 102 is performed in such a manner where the digital video data is stored in volatile or temporary storage so that ROM or other type of permanent storage does not need to be used to store digital video data before a determination is made that the digital video data is associated with an active monitoring status of the digital video alarm monitoring mode. Volatile or temporary storage may include random access memory (RAM). The RAM may be external cache memory. RAM may comprise static RAM (SRAM), dynamic RAM (DRAM), synchronous DRAM (SDRAM), double data rate SDRAM (DDR SDRAM), enhanced SDRAM (ESDRAM) and/or other forms of temporary storage. The temporary storage of the digital video data may be maintained through steps 102 through 112. In one or more embodiments, only after an active monitoring status is determined and an analysis of the digital video data indicates that the digital video data is related to a potential alarm event is the digital video data stored in digital video database 44. In this scenario, such digital video data may also be transmitted to alarm monitoring module 36, which is configured to store the digital video data on alarm monitoring database 34. Alarm monitoring database 34 may be ROM, PROM, EPROM, EEPROM, flash memory and/or or other forms of non-volatile or permanent storage.

As mentioned above, digital video alarm monitoring parameters may be utilized to determine whether digital video data identified with identifying data is associated with an active monitoring status or an inactive monitoring status. In one or more embodiments, one of the digital video alarm monitoring parameters includes one or more regions of interest. A region of interest may be a region within a camera view associated with a camera transmitting digital video data to digital video analytics server 18. For instance, the camera view may include a hallway. The hallway may include a door. When opened, the door permits a person access to a secure location within a commercial building. Accordingly, the region of interest may be the door in the hallway. As another non-limiting example, the camera view includes a parking lot of a department store or a grocery store.

Figures 3A, 3B:
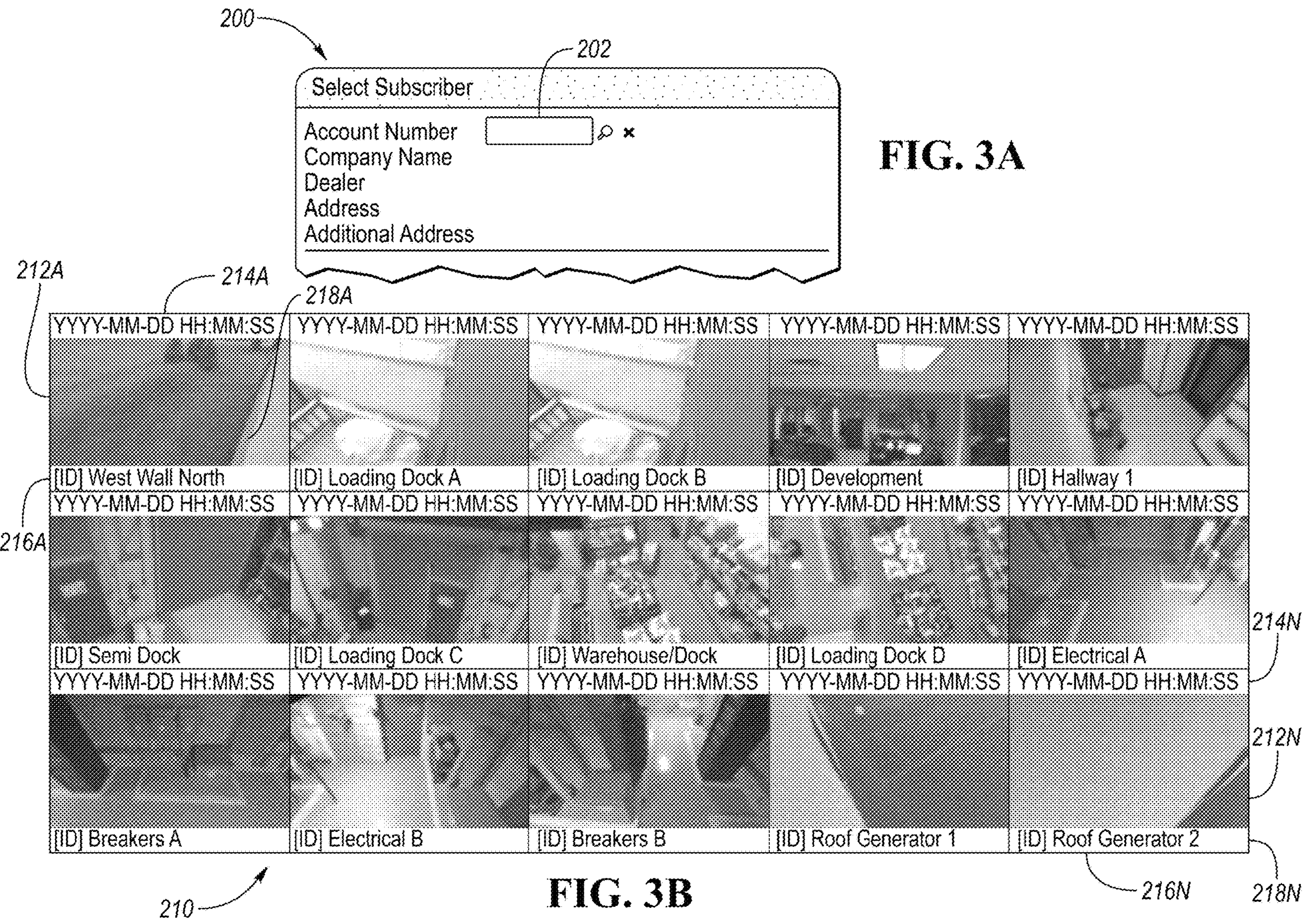
FIG. 3A is a graphical user interface ("GUI") configured to receive a subscriber account of a subscriber of digital video alarm monitoring services available through a digital video alarm monitoring computer system.
FIG. 3B is a GUI configured to display thumbnail views of network cameras according to one embodiment.

FIG. 3A is a GUI 200 configured to receive a subscriber account of a subscriber of digital video alarm monitoring services available through digital video alarm monitoring computer system 10, including alarm monitoring module 36. The user may be an operator at a central station using alarm monitoring module 36. In one or more embodiments, the operator is monitoring a subscriber to digital video alarm monitoring services of the central station. The subscriber may be associated or own client site 14 where client network 12 and network cameras 16A to 16N are installed. Alarm monitoring module 36 may be configured to display GUI 200 through user computer 38 and/or user mobile device 40. GUI 200 includes account number field 202. Account number field 202 is configured to receive input from a user of alarm monitoring module 36. Account number field 202 may be configured to receive an account number, which may be a numeric, alpha or alphanumeric string. Alarm monitoring module 36 may be configured to search accounts in response to entering the account number. Once an existing account is selected, then the other fields in GUI 202 are populated. These other fields may include company name, alarm monitoring dealer, address and additional address.

Once an account is selected by account number, then GUI 210 as depicted on FIG. 3B is displayed. GUI 210 includes thumbnail views 212A through 212N of network cameras 16A through 16N, respectively. As shown in FIG. 3B, thumbnail views 212A through 212N include a digital video frame from network cameras 16A through 16N. In other embodiments, one or more thumbnail views 212A through 212N may include digital video clips or a live stream of digital video from the respective network camera 16A through 16N. As shown in FIG. 3B, thumbnail views 212A through 212N include date and time stamps 214A through 214N, respectively. Each of the date and time stamps 214A through 214N include the date and time of the digital video frame from the respective network camera 16A through 16N in YYYY-MM-DD and HH:MM:SS format, respectively. In one or more embodiments, the data and time stamps 214A through 214N are included (e.g. embedded) in the video data received from network cameras 16A and 16N. Thumbnail views 212A through 212N also include network camera identifiers 216A through 216N, respectively, and camera descriptions 218A through 218N, respectively. Each network camera identifier 216A through 216N may include a one to three character identifier. Each camera description 218A through 218N may be an alphanumeric description of the view associated network video camera 16A through 16N. The arrangement and content of GUI 210 is configured to display digital video data (i.e. a digital frame as shown in FIG. 3B) and identifying data relating thereto so that the user obtains a large amount of information regarding the alarm monitoring account in a relatively short amount of time. GUI 210 is scrollable when there are more thumbnail views than fit into the active window including GUI 210.

Alarm monitoring module 36 may be configured to receive boundary lines through GUI 210 to define a region of interest. FIGS. 3C through 3I depict thumbnail view 220 in which boundary lines 222A through 222G are input by a user and displayed within thumbnail view 220 to define region of interest 224. As shown in FIGS. 3C through 3I, thumbnail view 220 is a view of an area leading to a back entrance of a commercial building. A user of digital video alarm monitoring computer system 10 may want to define a region of interest around sidewalks 226 leading up to the back entrance. The digital video alarm monitoring computer system 10 is configured to permit selection of boundary lines 222A though 222G to define region of interest 224 including sidewalk region 226.

As shown in FIGS. 3C to 3I, cursor movement and selections are made in a clockwise manner to define region of interest 224 of sidewalk region 226. In other embodiments, the cursor movement may be counterclockwise. The selections of corners to create boundary lines can also be made by tapping a touch screen including a thumbnail view. The display of the thumbnail view in a GUI is combined with making selections of corners of a region of interest overlayed on the thumbnail so that the correct region of interest is selected through the overlay sequence and the visual representation of the overlaid boundaries of the region of interest.

Figure 3G:
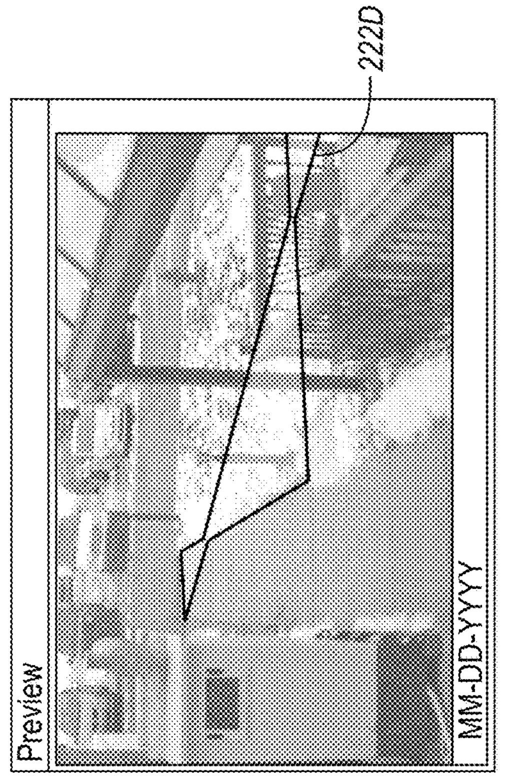
Figure 3H:
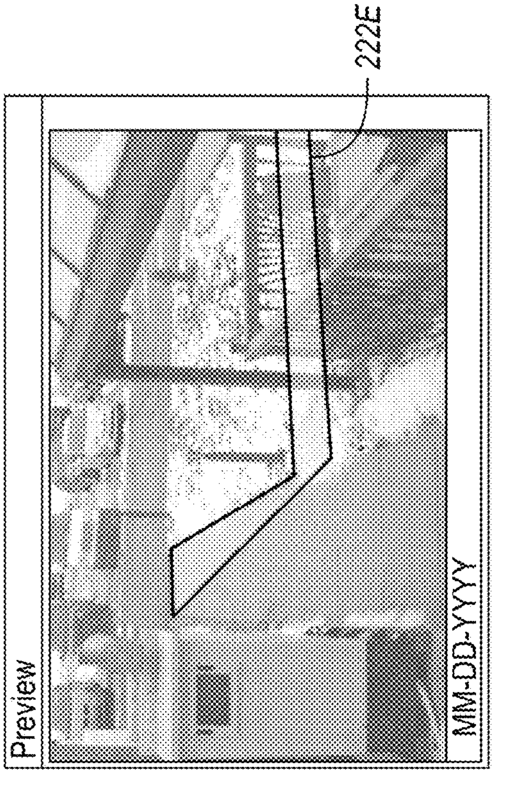
Figure 3I:
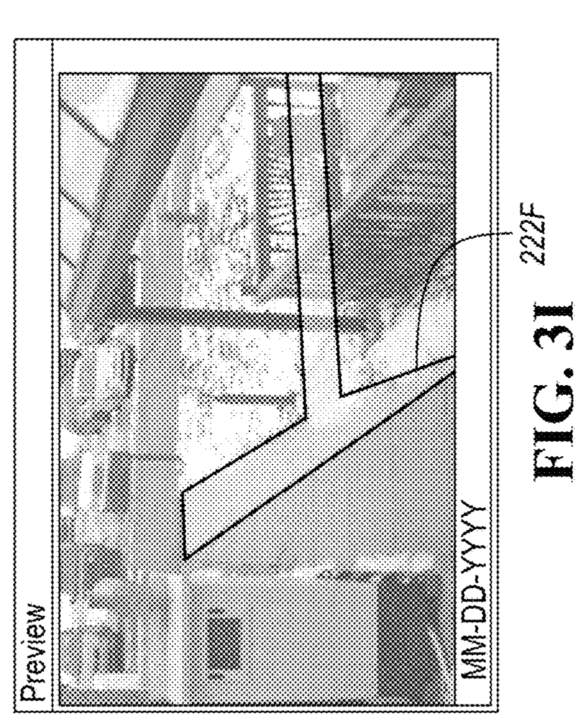
Figure 3J:
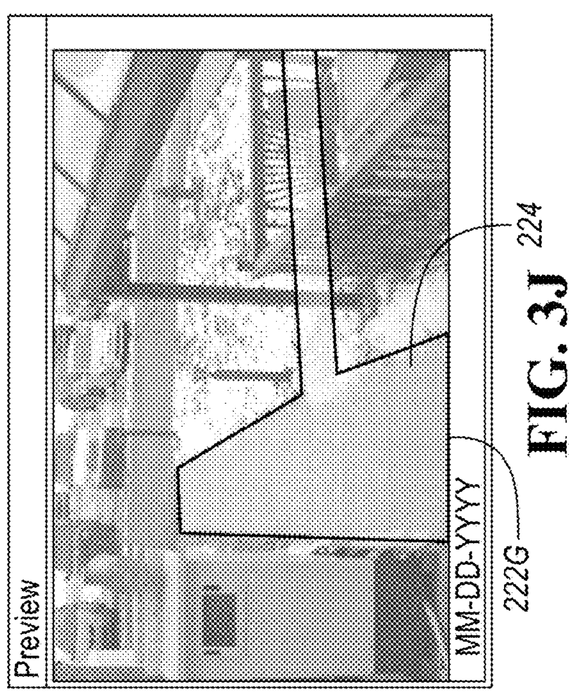

FIG. 3C depicts cursor selection at a corner of sidewalk region 226 shown in thumbnail view 220. As shown in FIG. 3D, the cursor is moved to a second corner of sidewalk region 226 to form boundary line 222A. As shown in FIG. 3E, the cursor is subsequently moved to a third corner of sidewalk region 226 to form boundary line 222B. As shown in FIG. 3F, the cursor is subsequently moved to a fourth corner of sidewalk region 226 to form boundary line 222C. As shown in FIG. 3G, the cursor is subsequently moved to a fifth corner of sidewalk region 226 to form boundary line 222D. As shown in FIG. 3H, the cursor is subsequently moved to a sixth corner of sidewalk region 226 to form boundary line 222E. As shown in FIG. 3I, the cursor is subsequently moved to a seventh corner of sidewalk region 226 to form boundary line 222F. As shown in FIG. 3J, the cursor is subsequently moved to an eighth corner of sidewalk region 226 to form boundary line 222G, thereby creating region of interest 224. As shown in FIG. 3J, region of interest 224 is semi-transparent so that the underlying thumbnail view 220 is visible to the user. This provides the benefit of visual inspection and confirmation that the proper region of interest has been selected.

Each region of interest may be user-selectable by using a GUI configured for display by alarm monitoring module 36. Accordingly, the region of interest may be any region in which the user desires to monitor for motion detection, object detection and/or alarm detection. Non-limiting examples of regions of interest include driveways, sidewalks, parking lots, doorways, hallways, fence lines, loading docks, offices, conference rooms and reception areas. The region of interest may be a simple or complex two-dimensional polygonal shape associated with a representation of the viewing area in a thumbnail view.

A two-dimensional description of a region of interest may be stored in alarm monitoring database 34. The region of interest description may be associated with the network camera used as the basis for creating the region of interest. This association may be used for purposes of motion and/or object detection as disclosed in one or more embodiments. The region of interest may also have a user-selected name and/or a unique identifier. These values may also be stored in alarm monitoring database 34 and associated with the region of interest and/or the network camera. The region of interest may also be associated with one or more analytics tags, which may also be stored in alarm monitoring database 34. Alarm monitoring database 34 may include a region of interest database including a record for each region of interest. The record may include the region of interest name and/or unique identifier, the region of interest two-dimensional description, the associated network camera, and one or more analytics tags associated with the region of interest. Each network camera is associated with digital video clips through the video header data. Through this association, the digital video clips may be associated with one or more regions of interest.

A GUI configured for display by alarm monitoring module 36 may be configured to receive a text string of a description of the region of interest created. The description may be utilized to associate the region of interest to other functionality within alarm monitoring module 36. The GUI configured to display by alarm monitoring module 36 may be configured to receive an analytics tag input. The analytics tag input may be associated with the region of interest and/or the description of the region of interest. In one or more embodiments, an analytics tag is a type or class of object configured to be detected within the region of interest. Non-limiting examples of analytics tags include vehicle or human being. Other non-limiting examples of analytics tags include vehicles such as passenger car, truck, and heavy machinery; human behavior such as arguing, agitation, and violent motions; clothing such as face masks, scarfs, ski masks, camouflage, combat uniform, and bullet proof vest; firearms such as long guns and short guns; animals such as horses, goats, dogs and cats. If no analytics tags are selected through the GUI, then alarm monitoring module 36 does not notify on any motion detection or object detection regardless of an analytics tag being recognized in a video clip by digital video analytics server 18. Unchecked analytics tags are ignored even if digital video analytics server 18 recognizes one of the unchecked analytics tags within an associated region of interest.

Alarm monitoring module 36 may be configured to determine a video alarm event when an object detected is associated with an analytics tag, the analytics tag is associated with a region of interest, and the object detected intersects with a region of interest. For instance, if person is active as an analytics tag for region of interest 224 (i.e. sidewalk region 226), any time digital video analytics server 18 detects a person within region of interest 224, an alarm event is determined. The alarm event may be transmitted by alarm monitoring module 36. Alarm monitoring module 36 may be configured to format data (e.g. a digital video clip) associated with the alarm event for display through a GUI.

In one or more embodiments, digital video analytics server 18 is configured to perform motion detection and/or object detection on digital video clips. One or more regions of interest may be selected, for instance, using a process as described in FIGS. 3C through 3J. The selected regions of interest may be associated with a network camera and digital video clips and frames as set forth above.

Figure 4:
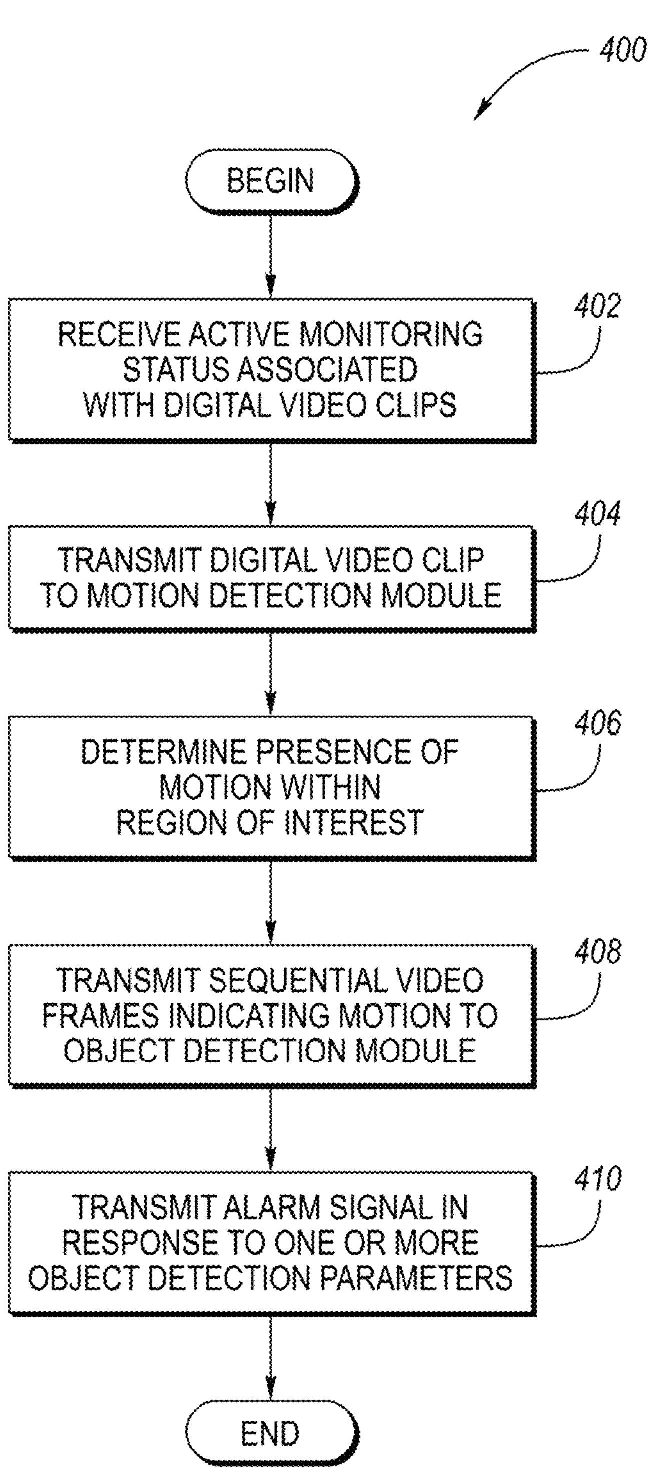
FIG. 4 is a flowchart depicting a series of steps performed by a digital video analytics server relating to motion and/or object detection on digital video clips according to one embodiment.

FIG. 4 is flowchart 400 depicting a series of steps performed by digital video analytics server 18 relating to motion and/or object detection on digital video clips according to one embodiment. As depicted in step 402 of FIG. 4, gatekeeper server 30 receives an active monitoring status associated with one or more digital video clips from alarm monitoring server 22. The active monitoring status indicates that the one or more digital video clips are active. The active monitoring status may further indicate that one or more regions of interest are active on the one or more digital video clips. In one or more embodiments, the one or more regions of interest may be the entire area of the digital video clip or may be one or more portions thereof.

As depicted in step 404 of FIG. 4, gatekeeper server 30 is configured to transmit the one or more digital video clips associated with the active monitoring status to motion detection module 46. When the active monitoring status is associated with a subregion of the one or more digital video clips (e.g. one or more regions of interest), gatekeeper server 30 may be configured to crop the digital video clips so that only the digital video data associated with the subregion is transmitted to motion detection module 46. The gatekeeper server 30 may also be configured to join two or more subregions into a single digital video clip. For instance, a number of subregions may be joined at their edges to create a digital video clip with x and y pixel dimensions defined by the addition of the number of subregions joined. For instance, if four different subregions have dimensions of 257×192 pixels or less, then those four subregions can be joined to form a digital video clip having dimensions of 1028×768. By joining subregions of different digital video clips that only contain active monitoring areas, only relevant digital video data is being analyzed by motion detection module 46. This has the benefit of reducing computing processing time and/or reducing cost associated with computing processing time of motion detection module 46.

Motion detection module 46 may be a module configured to implement one or more artificial intelligence (AI) algorithms to detect motion in the digital video clip. The digital video clip may be comprised of one or more digital video frames. Motion detection module 46 may be hosted on a server different than gatekeeper server 30, while both servers are part of digital video analytics server 18. Motion detection module 46 may be configured to compare sequential digital video frames to determine one or more motion parameters, such as the presence of motion, the position of motion within the sequential digital video frames, and/or the identification of the sequential video frames containing the motion within the digital video clip or the sequential digital video frames. The sequential video frames may be consecutive in time or may be sampled so that there is a time gap between each sequential video frame. Motion detection sensitivity may be used as a parameter for determining motion. Motion detection sensitivity may refer to the percentage of pixels within a region of interest that show movement from one digital video frame to the next. The motion sensitivity percentage may be any of the following values or in a range of any two of the following values: 0.01%, 0.1%, 0.5%, 1%, 5% and 10%. The lower the motion sensitivity percentage, less pixels need to move to trigger motion detection. A relatively low motion sensitivity percentage may be used in regions of interest of high importance (e.g. points of entry into a secure area). The higher the motion sensitivity percentage, more pixels need to move to trigger motion detection. A relatively high motion sensitivity percentage may be used in regions of interest that are prone to false positives. Motion detection module 46 may be configured to transmit one or more of the motion parameters to gatekeeper server 30.

As depicted in step 406 of FIG. 4, gatekeeper server 30 is configured to determine if the position of any motion detected by motion detection module 46 is within a region of interest associated with the digital video clip. If gatekeeper server 30 determines motion positioned within a region of interest, gatekeeper server 30 gathers the sequence of digital video frames associated with the motion. The gathering can be accomplished by the receipt of gatekeeper server 30 of the identification of the sequence of digital video frames associated with each motion from motion detection module 46 and obtaining the identified digital video frames from an associated digital video clip, which may be stored in digital video database 44.

As depicted in step 408 of FIG. 4, gatekeeper server 30 is configured to transmit sequential video frames indicating motion to object detection module 48. Object detection module 48 may be a module configured to implement one or more artificial intelligence (AI) algorithms to detect objects in the sequential video frames of the digital video clip. Object detection module 48 may be hosted on a server different than gatekeeper server 30, while both servers are part of digital video analytics server 18. The sequential video frames may be consecutive in time or may be sampled so that there is a time gap between each sequential video frame. Object detection module 48 may be configured to detect the presence of one or more objects within the one or more of the sequential video frames indicating motion. Object detection module 48 may be configured to determine one or more object detection parameters, such as, without limitation, the type of object, the class of object, the position of the object within each digital video frame, and the identification of the one or more frames containing the object. The object class may encompass several object types. For instance, the object class may be animals and the object types falling under the animals object class may include dog, cat, horse, tiger and turtle. Object detection module 48 may be configured to transmit one or more of the one or more object detection parameters to gatekeeper server 30.

As depicted in step 410 of FIG. 4, gatekeeper server 30 is configured to transmit an alarm signal to alarm monitoring module 36 in response to one or more object detection parameters. In one embodiment, gatekeeper server 30 compares the type of object with one or more active analytics tags to determine the presence of a tracked object. If gatekeeper server 30 determines the presence of a tracked object, then gatekeeper server 30 determines if the location of the object detected intersects with a region of interest associated with an active analytics tag. For instance, if the region of interest is a doorway and a human is an analytics tag associated with the doorway, then an alarm signal is transmitted if the type of object is a human and the location of the human intersects with the doorway. Conversely, an alarm signal is not transmitted when the type of object is not associated with a region of interest. For instance, if the region of interest is a doorway and a human is the only analytics tag associated with the doorway, then an alarm signal is not transmitted if the type of object is an animal or other non-human object type even if the location of the detected object intersects with the doorway. As another example, the region of interest may be a doorway and the object detected is a human. However, if the location of the human is not detected within the region of interest, then an alarm signal is not transmitted. In this way, relatively less alarm signals are transmitted to alarm monitoring module 36. Digital video analytics server 18 is configured to serve a filtration function to selectively filter alarm signals that do not meet the conditions above from transmission to alarm monitoring module 36. In this way, less false positive alarm signals are transmitted to alarm monitoring module 36, thereby reducing or eliminating additional analysis that would otherwise be performed by alarm monitoring module 36.

In one embodiment, gatekeeper server 30 is configured to transmit an alarm signal when gatekeeper server 30 determines motion positioned within a region of interest without performing object detection. This embodiment may be used when object detection is not necessary to determine the presence of an alarm event, thereby avoiding the consumption of computing power associated with object detection.

The transmitted alarm signal may include one or more motion detection parameters and/or one or more object detection parameters. For instance, the one or more motion detection parameters may be the position of motion within the sequential digital video frames and the one or more object detection parameters may be the position of the detected object within the sequential digital video frames and the type of class of the object. The motion and object detected sequential digital video frames may also be transmitted to alarm monitoring module 36. However, as set forth above, relatively less digital video frames are transmitted to alarm monitoring module 36 because only filtered digital video frames (e.g. only those including tracked objects intersecting with a region of interest) are transmitted to alarm monitoring module 36. This represents a benefit of less data being transmitted and therefore, less data transmission fees (e.g. cellular fees).

The filtered digital video frames may also be stored in digital video database 44. Relatively less digital video frames are stored in digital video database 44 because only filtered digital video frames (e.g. only those including tracked objects intersecting with a region of interest) are stored in digital video database 44. This represents a benefit of less data being stored and therefore, less data storage costs (e.g. cloud storage or on-premises database storage costs). The one or more motion detection parameters and/or the one more object detection parameters associated with the filtered digital video frames may also be stored in digital video database 44. The one or more motion detection parameters and/or the one more object detection parameters associated with the filtered digital video frames may be linked within digital video database 44.

Upon receiving an alarm signal and data related thereto, alarm monitoring module 36 is configured to determine the presence of an alarm event. Alarm monitoring module 36 may be configured to display an icon or other indicator of video alarm events occurring over a selected period for one or more supervised network cameras. Each icon or other indicator may be color coded depending on the status of the video alarm events. For instance, a first color (e.g. green) may depict that the video network event has not been viewed. A second color (e.g. yellow) may depict that the video alarm event is currently being viewed. A third color (e.g. grey) may depict that the video alarm event was viewed. The alarm events may be prioritized based on the alarm signal and related data. For instance, a first alarm signal may be indicative of an animal near a fence line at a farm where the animal should not be present and a second alarm signal may be indicative of a suspicious bag near the fence line at a farm. Alarm monitoring module 36 may be configured to assign a higher and lower priority to these alarm events. For instance, the suspicious bag may be a higher priority alarm event than the animal near the fence. In more general terms, alarm monitoring module 36 may prioritize the alarm events in response to a priority of the detected object within a region of interest. The alarm monitoring module 36 may also be configured to prioritize alarm events in response to the types of regions of interest (e.g. internal doorway versus external doorway). These priorities may be pre-configured in alarm monitoring module 36 or user-selected through an interface configured by alarm monitoring module 36. The digital video alarm signals may be processed based on the priority of each digital video alarm signal. For instance, a first higher priority action may be taken in response to receiving a first digital video alarm signal associated with a first priority and a second lower priority action may be taken in response to receiving a second digital video alarm signal associated with a second priority lower than the first priority. Alarm monitoring module 36 may be configured to determine a priority in response to one or more object detection parameters of a digital video clip. The higher priority action may be transmitting the digital video alarm signal to an authority server. The authority server may be a police server, a fire department server, a government authority server, a private security server, and/or another alarm server. The lower priority action may not include transmitting the digital video alarm signal to any authority server. Instead, the lower priority action may be displaying the digital video clip on a GUI hosted by alarm monitoring module 36. The prioritization of digital video clips may be based on a determination of the potential event associated with the digital video clip. For instance, the presence of a certain object type within a certain region of interest may have a higher priority than finding a different object type within the same region of interest. In another scenario, the presence of a certain object type within a certain region of interest may have a higher priority than finding the certain object type within a different region of interest. Under this scenario, the object type may be human. However, the region of interest may differ in that one region of interest may indicate an intrusion and another region of interest may indicate a loss of life. As a third alternative, the region of interest may indicate that the human is in an approved area. Alarm monitoring module 36 may be configured to format and display a GUI to obtain an operator's selection of the priorities associated with digital video alarm signals including one or more regions of interest, one or more object detection parameters, and/or one or more analytics tags.

Figure 3K:
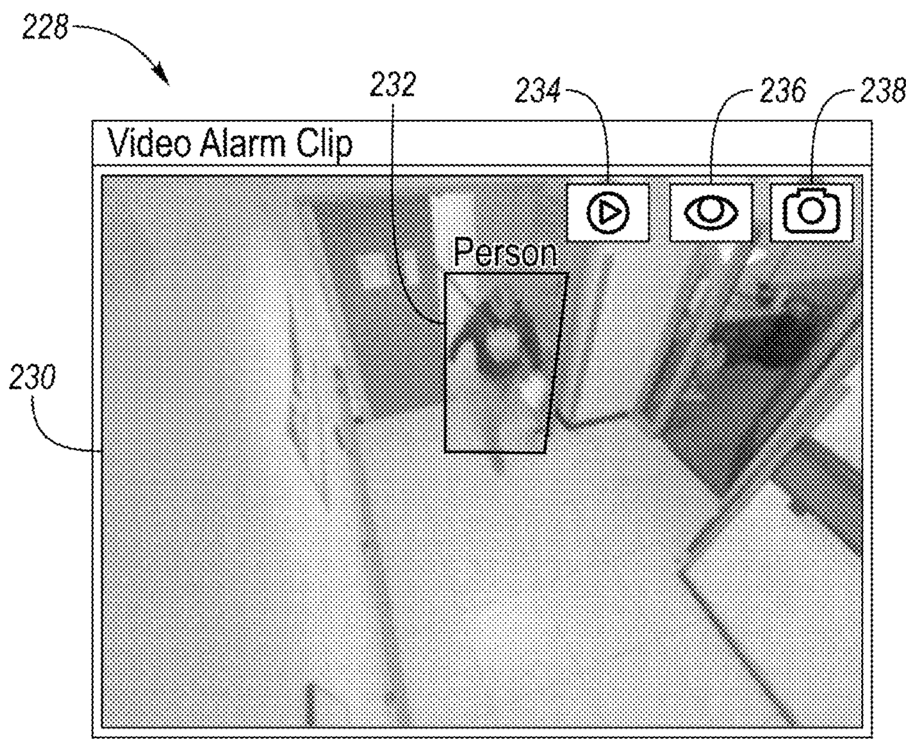
FIG. 3K is a GUI configured to display a digital video frame associated with a digital video alarm event.

Upon selecting the icon or other indicator of a video alarm event, the digital video clip (e.g. a sequence of digital video frames) associated with the video alarm event may be displayed through a GUI. FIG. 3K depicts GUI 228 displaying digital video frame 230 of a digital video clip associated with a video alarm event. GUI 228 is configured to display the digital video frames of a digital video clip associated with a video alarm event. As shown in FIG. 3K, the digital video clip does not include a user selected region of interest. In the embodiment shown, the entire area of the digital video clip is considered a default region of interest. As described in one or more embodiments, digital video analytics server 18 is configured to determine from the digital video clip the presence of and identity of an object through object detection. As shown in FIG. 3K, digital video analytics server 18 detected the presence an object identified as person 232. The object identity may be an analytics tag. As shown in FIG. 3K, the analytics tag "person" is displayed above the object detected. In one or more embodiments, digital video frame 230 may be magnified and/or cropped such that GUI 228 displayed a magnified version of the object (i.e. person 232).

When live view icon 234 is selected by an operator, the live camera view associated with the digital video clip is displayed on GUI 228. When analytics icon 236 is selected by an operator, GUI 228 may be used to manage the analytics displayed on the digital video clip. When capture icon 238 is selected, a screenshot of digital video frame is captured and stored. The screenshot may be stored in an alarm report associated with the digital video alarm event.

Figure 3L:
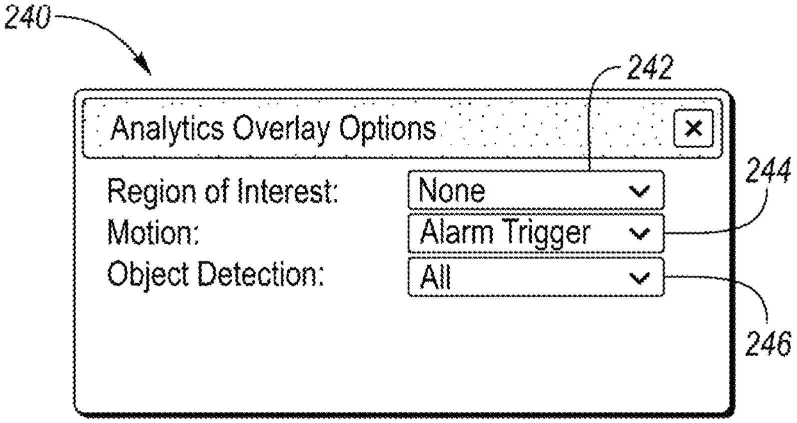
FIG. 3L is a GUI configured to display one or more analytics overlay options according to one or more embodiments.

Selecting analytics icon 236 displays GUI 240 as shown in FIG. 3L. GUI 240 is configured to display one or more analytics overlay options. As shown in FIG. 3L, the analytics overlay options include region of interest, motion detection and object detection. Region of interest is associated with region of interest dropdown menu 242. Motion detection is associated with motion detection dropdown menu 244. Object detection is associated with object detection dropdown menu 246.

Figure 3M:
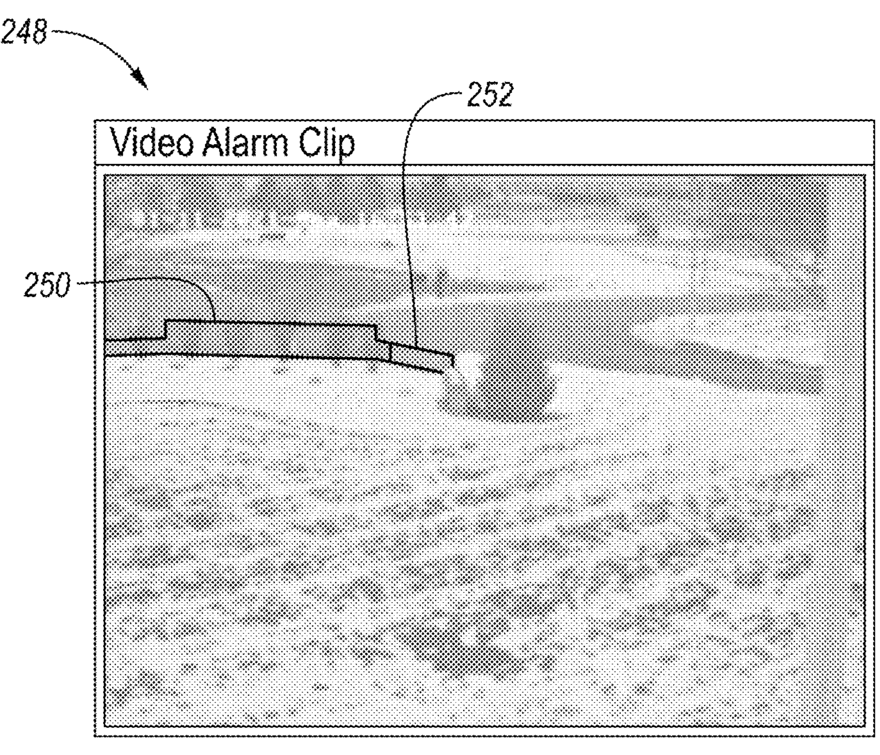
FIG. 3M is a GUI configured to display one or more regions of interest associated with a digital video clip according to one embodiment.
Figure 3N:
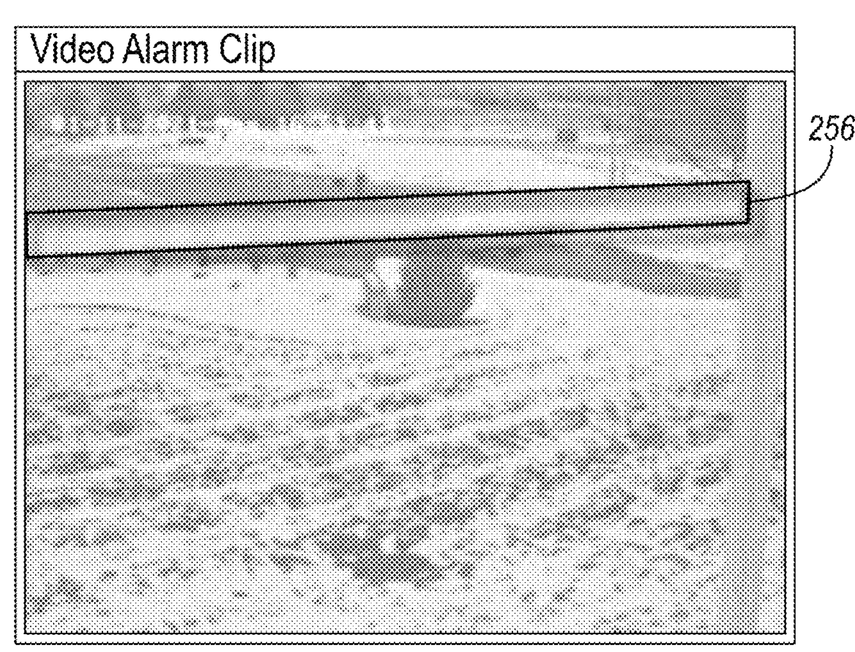
FIG. 3N is a GUI configured to display a region of interest triggering a digital video alarm event.

Region of interest dropdown menu 242 is configured to permit an operator to toggle a region of interest highlight on or off for the regions of interest associated with the digital video clip by selecting a "region of interest" option. As shown in GUI 248 of FIG. 3M, first region of interest 250 and second region of interest 252 are displayed by selecting the "region of interest" option from region of interest dropdown menu 242. In one embodiment, a GUI may be available to toggle each region of interest off or on one by one. In another embodiment, a single GUI may be available to toggle all associated regions of interest on and off. By selecting an "alarm trigger" option from region of interest dropdown menu displays the one or more regions of interest triggering a video alarm event. As shown in GUI 254 of FIG. 3N, region of interest 256 triggering the digital video alarm event is displayed by selecting the "alarm trigger" option from region of interest dropdown menu 242.

Figure 3O:
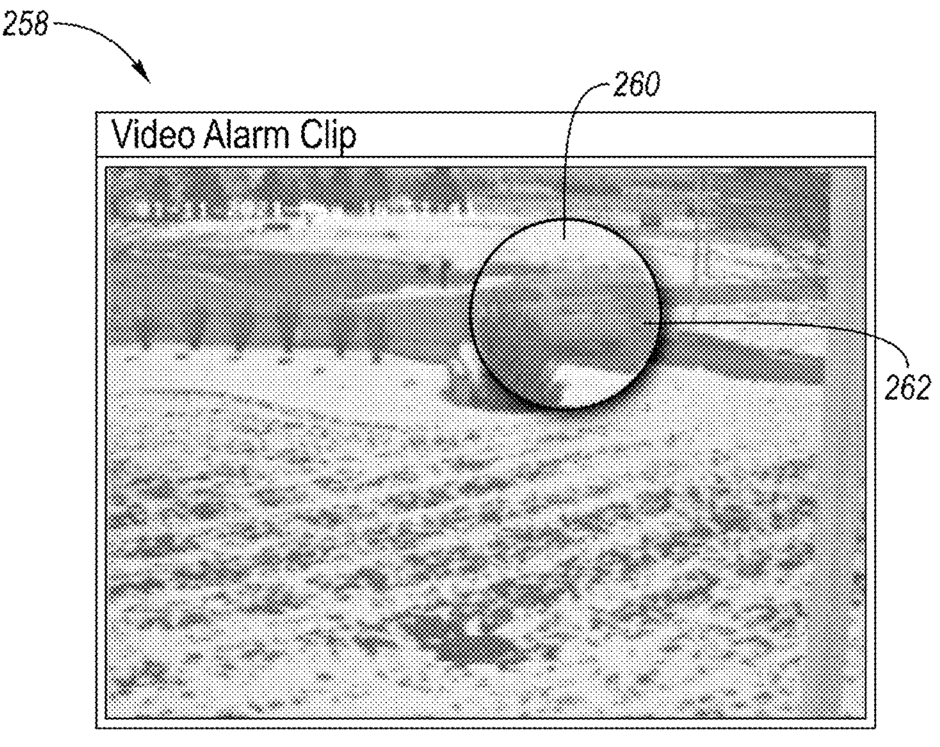
FIG. 3O is a GUI configured to display video motion detection data overlayed on the object being detected within a digital video clip associated with a digital video alarm event.
Figure 3P:
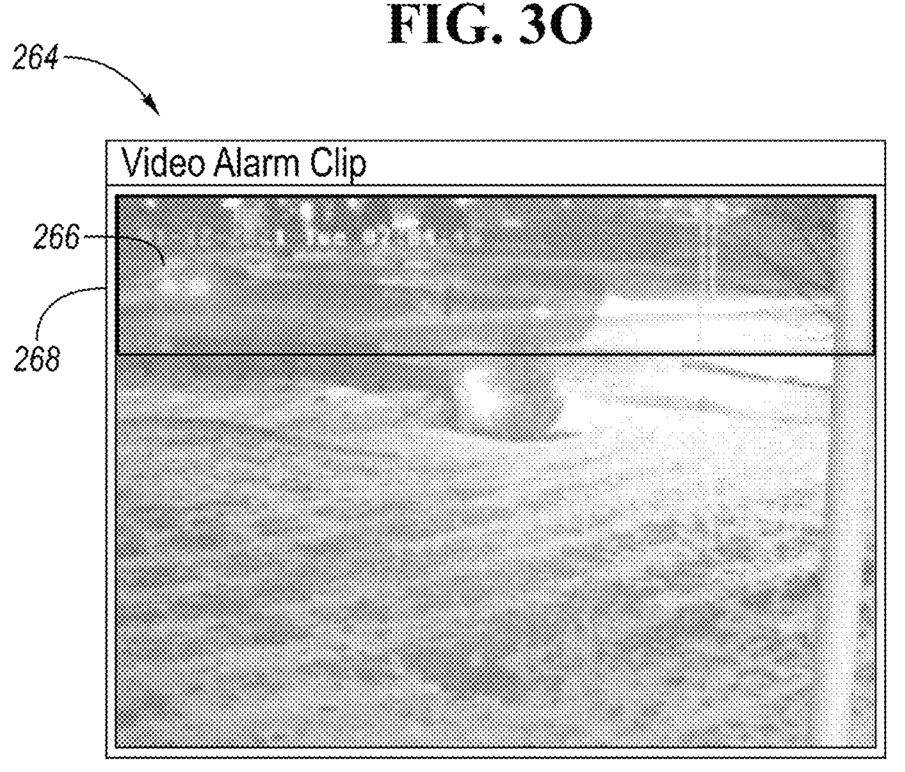
FIG. 3P is a GUI configured to display cumulative video motion detection data within a digital video clip associated with a digital video alarm event.

Motion detection dropdown menu 244 may include a "motion" option, a "none" option, an "alarm trigger" option and an "all" option. If an operator selects the "motion" option from motion detection dropdown menu 244, then the highlighted motion associated with the video alarm event is captured. If an operator selects the "none" option from motion detection dropdown menu 244, none of the motion is displayed in GUI 240, and is therefore hidden from the digital video clip shown in GUI 240. If an operator selects the "alarm trigger" option from motion detection dropdown menu 244, GUI 240 displays only the motion associated with a digital video alarm event. As shown in GUI 258 of FIG. 3O, motion video data 260 associated with a video alarm event is displayed. As shown in FIG. 3O, motion video data 260 is a number of pixels highlighted in response to the location of the pixels changing position between digital video frames of the digital video clip. Motion video data 260 may overlay the object being detected, which is vehicle 262 as shown in FIG. 3O. If an operator selects the "all" option from motion detection dropdown menu 244, then all motion captured by the network camera associated with the digital video clip relating to the video alarm event is displayed through GUI 240. As shown in GUI 264 of FIG. 3P, cumulative video motion data 266 is displayed in response to selecting the "all" option from motion detection dropdown menu 244. GUI 264 also includes bounding box 268 framing cumulative video motion data 266. By viewing both GUIs 264 and 266, an operator can compare motion video data 260 and 266 to determine a course of action in view of the video alarm event.

Figures 3Q, 3R, 3S:
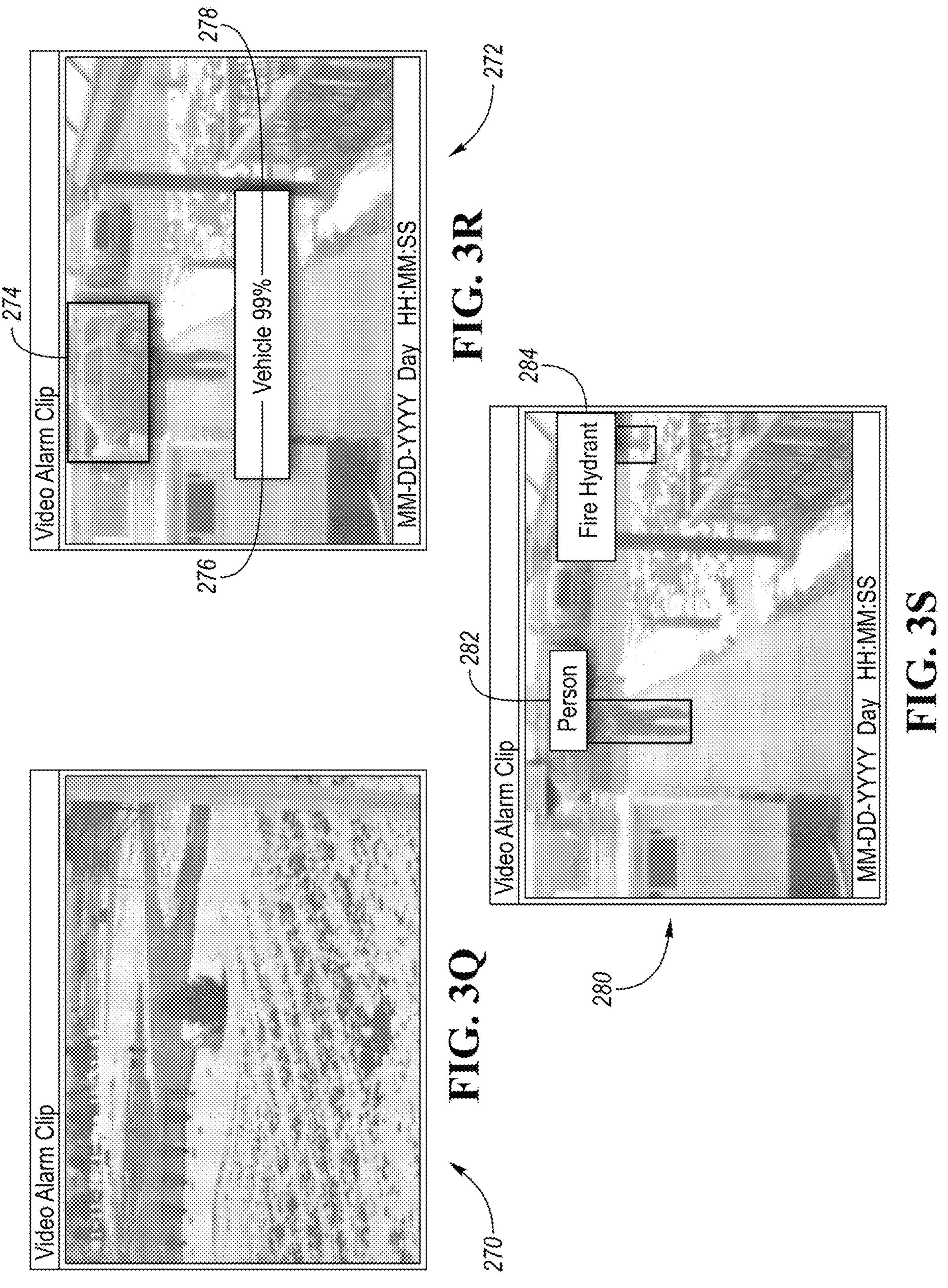
FIG. 3Q is a GUI configured to display a digital video clip where no analytics tags are displayed.
FIG. 3R is a GUI configured to display a digital video clip with a bounding box and a label of an analytics tag and a percentage confidence associated with an object detected.
FIG. 3S is a GUI configured to display a digital video clip where all active analytics tags are displayed in a digital video clip.
Figure 3T:
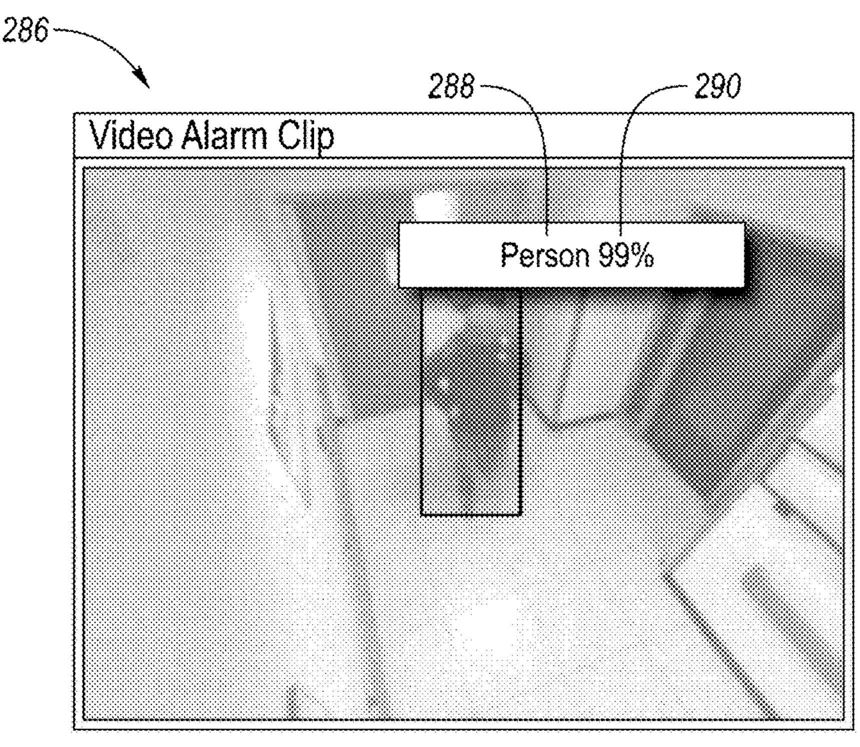
FIG. 3T is a GUI configured to display a digital video clip where the highest percentage confidence object analytics tag on the digital video is displayed.

Object detection dropdown menu 246 may include a "none" option, an "alarm trigger" option, an "all" option, and a "best alarm trigger" option. If an operator selects the "none" option from object detection dropdown menu 246, then all active analytics tags are not displayed on the digital video clip. FIG. 3Q depicts GUI 270 in which the "none" option is selected, and therefore, no analytics tags are shown in the digital video clip. If an operator selects the "alarm trigger" option from object detection dropdown menu 246, then the analytics tag that triggered the video alarm event is displayed on the digital video clip. FIG. 3R depicts GUI 272 in which the "alarm trigger" option is selected. GUI 272 displays bounding box 274 around the object (i.e. a vehicle) associated with the analytics tag that triggered the video alarm event. GUI 272 also includes label 276 of the analytics tag and percentage confidence 278 associated with the object detected. Label 276 is "Vehicle" and percentage confidence is "99%". If an operator selects the "all" option from object detection dropdown menu 246, then all analytics tags active in alarm monitoring module 36 are displayed on the digital video clip. GUI 280 of FIG. 3S displays person analytics tag 282 and fire hydrant analytics tag 284. The "all" option displays active analytics tags even if the analytics tag did not trigger an alarm event. If an operator selects the "best alarm trigger" option from object detection dropdown menu 246, then the highest percentage confidence object analytics tag on the digital video clip is displayed. As an example of the selection of the "best alarm trigger" option, GUI 286 of FIG. 3T displays person analytics tag 288 and percentage confidence 290.

Figure 3U:
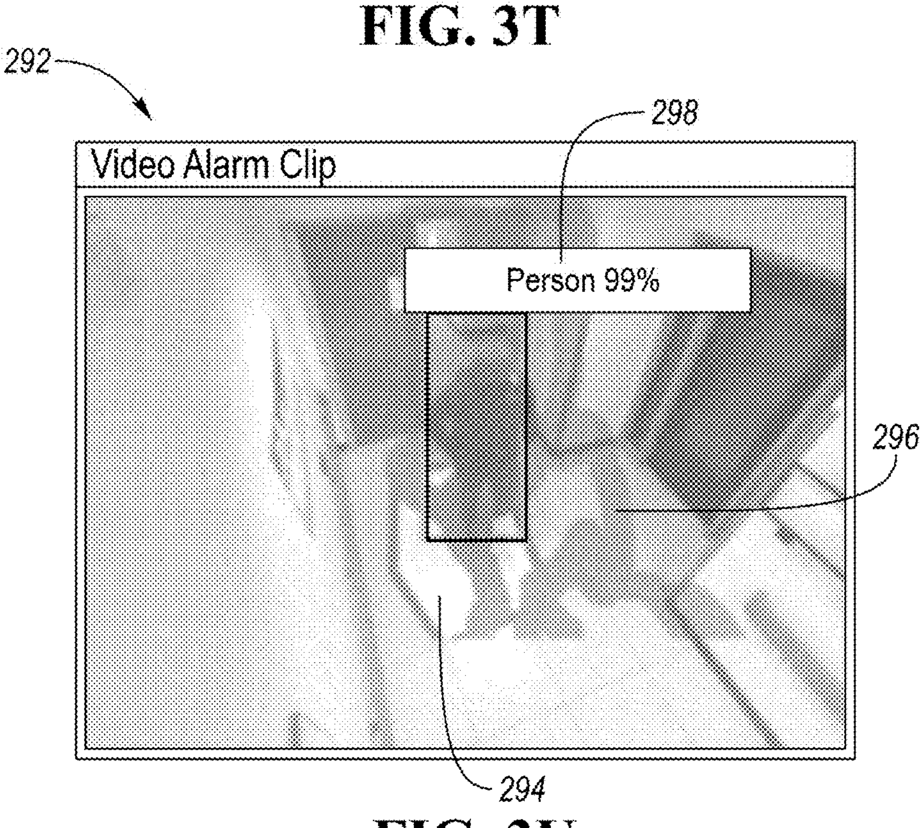
FIG. 3U is a GUI configured to display cumulative video motion and object detection data associated with a digital video alarm event and a region of interest.

GUI 292 displays an example where the "alarm trigger" option is selected from region of interest dropdown menu 242, the "all" option is selected from motion detection dropdown menu 244, and the "best alarm trigger" option is selected from object detection dropdown menu 246. As shown GUI 292 of FIG. 3U, region of interest 294 is displayed, video motion data 296 is displayed and analytics tag 298 is displayed. GUI 292 also displays the percentage confidence of the best alarm analytics tag. GUI 292 also discloses a bounding box around the object detected.

Digital video alarm monitoring computer system 10 may be configured to detect a loitering event associated with a digital video stream. In one or more embodiments, the detection is conducted such that less data and computing power is consumed to determine a video alarm loitering event. Reduced consumption of resources is premised on detecting a video alarm loitering event by periodically sampling a digital video stream instead of analyzing a relatively large number of digital video frames within a relatively short period of time. In one embodiment, the periodic sampling may occur at a time interval. The time interval may be any of the following values or in the range of any two of the following values: 5, 10, 15, 20, 25, 30, 35, 40, 45, 50, 55, and 60 seconds. This strategy is implemented by one or more embodiments of digital video alarm monitoring computer system 10 by recognizing that loitering events develop over a relatively long period of time, but only a fraction of the digital video frames within that relatively long period of time need to be analyzed to determine a loitering event.

Figure 5:
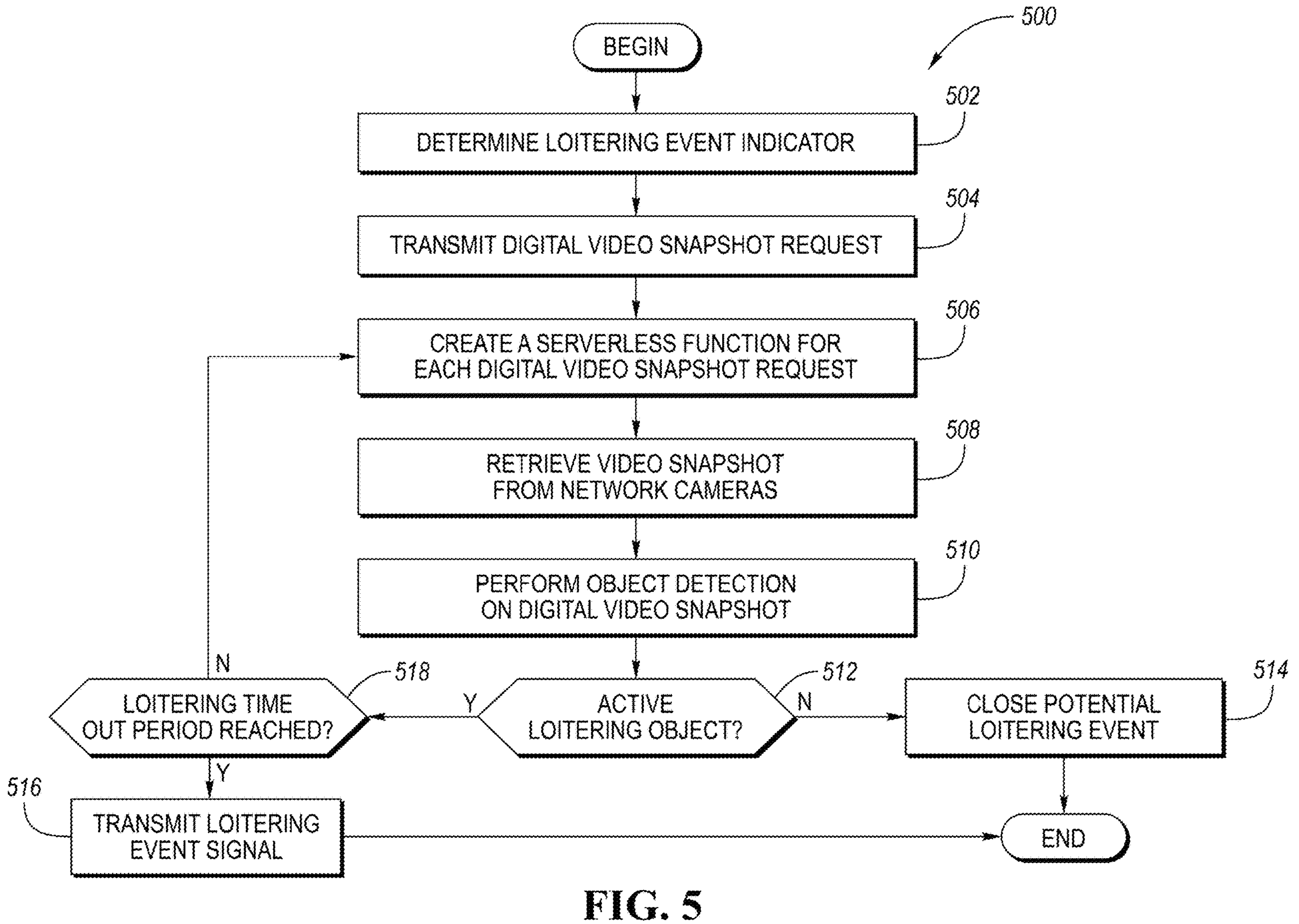
FIG. 5 is a flowchart depicting a series of steps performed by a digital video analytics server relating to detection of a digital video alarm loitering event using motion and/or object detection on digital video clips according to one embodiment.

FIG. 5 is flowchart 500 depicting a series of steps performed by digital video analytics server 18 relating to detection of a video alarm loitering event using motion and/or object detection on digital video clips according to one embodiment. Although FIG. 5 depicts a certain sequence of the series of steps, the steps may be rearranged and sequenced in a different order depending on the implementation of an embodiment. The steps may also be omitted, modified and added to depending on the implementation of the embodiment.

Flowchart 500 includes step 502. As described in step 502 and with reference to FIG. 1, gatekeeper server 30 determines a loitering event indicator associated with a digital video stream. The digital video stream may be associated with one of network cameras 16A to 16N. An operator can select one or more network cameras 16A to 16N activated for loitering detection. Gatekeeper server 30 may be configured to determine a loitering event indicator with a digital video stream by analyzing one or more digital video clips and/or one or more digital video frames. The analysis may indicate the initial stage of a potential loitering event. The initial stage may be a door open or ajar within the digital video stream, a bag appearing within the digital video stream, or a human being appearing within the digital video stream. An operator can select one or more initial stages of a potential loitering event.

The potential loitering event may also have a loitering time out period associated with it. The loitering time out period is the period in which the object associated with the potential loitering event must persist within the digital video stream to be considered a loitering event. The loitering time out period may be different based on the type of potential loitering event. For instance, the loitering time out period may be shorter for a bag and longer for a human being because determining a loitering event associated with a stationary object may not take as long. The loitering time out period may be any of the following values or in a range of any two of the following values: 60, 70, 80, 90, 100, 110, 120, 130, 140, 150, 160, 170, and 180 seconds. The time out period may be specified by an operator through alarm monitoring module 36.

Flowchart 500 includes step 504. As described in step 504 and with reference to FIG. 1, gatekeeper server 30 transmits a digital video snapshot request in response to determining a loitering event indicator to snapshot queue 50. In one or more embodiments, a digital video snapshot is a digital video frame. Snapshot queue 50 may be configured to receive a number of unique digital video snapshot requests to be processed by digital video analytics server 18. The digital video snapshot request may include an identification of a network camera responsible for the digital video stream that includes the loitering event indicator. The digital video snapshot request may also include an identification of one or more active loitering objects associated with the network camera. For instance, the one or more active loitering objects may include a bag, a human, and an open door.

Flowchart 500 includes step 506. As described in step 506 and with reference to FIG. 1, snapshot scheduler 52 creates a function for each digital video snapshot request currently residing in the snapshot queue 50. Snapshot scheduler 52 may be functionality residing on digital video analytics server 18. In one or more embodiments, the function may be a serverless function. The serverless function is a computer service that permits execution of the function without provisioning or managing a server. Accordingly, the serverless function may be performed on demand and only when necessary to perform the loitering event detection process. The serverless function may be a lambda worker. FIG. 1 depicts serverless function 54. Serverless function 54 is configured to receive a digital video snapshot request.

Flowchart 500 includes step 508. As described in step 508 and with reference to FIG. 1, serverless function 54 retrieves a digital video snapshot from an associated network camera selected from the network cameras 16A to 16N based on the digital video snapshot request, which includes an identification of the associated network camera. Serverless function 54 creates a connection between itself and the associated network camera selected from the network cameras 16A to 16N. Once the connection is established, serverless function 54 transmits a request for the digital video snapshot. The connection permits the stream of one or more digital video snapshots from the network camera back to the associated serverless function. Serverless function 54 transmits the digital video snapshot from the associated network camera to object detection module 48. In one or more embodiments, a different instance of serverless function 54 is created for each digital video snapshot request.

Flowchart 500 includes step 510. As described in step 510 and with reference to FIG. 1, object detection module 48 performs object detection on the digital video snapshot. Object detection module 48 is configured to detect objects within the digital video snapshot. Object detection module 48 may be configured to detect any object detectable by object detection module 48. Non-limiting examples of objects relevant to a loitering event include a vehicle or a human being. Other non-limiting examples of loitering event objects include vehicles such as passenger car, truck, and heavy machinery; human behavior such as arguing, agitation, and violent motions; clothing such as face masks, scarfs, ski masks, camouflage, combat uniform, and bullet proof vest; firearms such as long guns and short guns; animals such as horses, goats, dogs and cats. Object detection module 48 is configured to transmit the one or more objects detected within one or more digital video snapshots to the serverless function 54 associated with the digital video snapshot. Object detection module 48 is configured to transmit one or more object detected parameters along with an identification of the object detected. The one or more object detection parameters may include an object type, an object class, and/or an object location within the digital video snapshot. The object detection may be configured to conduct person tracking so that the presence and/or movement of a person between digital video snapshots may be determined.

In one or more embodiments, motion detection may be performed in addition to or alternatively from the object detection of step 48. The motion detection may be utilized to determine the presence of an active loitering object. For instance, motion is detected in successive digital video snapshots. This type of detection may be useful for certain types of potential loitering events where there are not other sources of movement in the digital video stream (e.g. sources of movement not associated with the potential loitering event).

In one or more embodiments, loitering detection can differentiate between a potential loitering event and a tamper alarm (e.g. oil or paint sprayed on the camera lens or the camera lens being covered up) and/or a malfunction alarm (e.g. mechanical drift or chip malfunction).

Flowchart 500 includes decision block 512. As described in decision block 512 and with reference to FIG. 1, serverless function 54 determines whether the digital video snapshot includes an active loitering object. In one embodiment, serverless function 54 is configured to determine whether the digital video snapshot includes an active loitering object by comparing each of the objects detected in the digital video snapshot with the one or more active loitering objects for the digital video stream including the digital video snapshot. In one or more embodiments, if an active loitering object is detected, then block 512 further determines if the location of the object detected that matches the active loitering object intersects with a region of interest active within the digital video stream including the digital video snapshot. In one or more embodiments, the comparison performed in block 512 is between a key digital frame and the current digital video snapshot. The key digital video frame may be a frame that represents a status quo scene view of the digital video camera without a loitering object being present. If the current digital video snapshot has an object (e.g. the same object in the last digital video snapshot) that is not present in the key digital video frame, then decision block 512 may return a yes value. This embodiment may be useful when a potential loitering event involved a stagnant object, such as a duffel bag or a vehicle.

If an active loitering object is detected as set forth above (e.g. an active loitering object intersects with a region of interest), then flowchart 500 determines if the loitering time out period has been reached, as set forth in decision block 518. The loitering time out period may be stored in snapshot scheduler 52. Snapshot scheduler 52 is configured to determine whether the loitering time out period has been reached for a potential loitering event being tracked. Snapshot scheduler 52 may keep track of how many sequential video snapshots have included the active loitering object. Snapshot scheduler 52 may also store the time interval for the digital video snapshot requests. Snapshot schedule 52 is configured to determine whether the loitering time out period has been reached based on the number of sequential digital video snapshots having the active loitering object and the time interval for the digital video snapshot requests.

If the loitering time out period has been reached in connection with a loitering event indicator and the objects detected in response to a number of digital video snapshot requests, then a loitering event has been determined. As set forth in step 516, a loitering event signal is transmitted. The loitering event signal may be transmitted from snapshot scheduler 52 to gatekeeper server 30 to alarm monitoring module 36. The loitering event signal may include the identification of the loitering object, the region of interest, the network camera, and the digital video snapshots including the loitering object. Alarm monitoring module 36 may be configured to inform the operator of the loitering event signal. Alarm monitoring module 36 may be configured to display the digital video snapshots including the loitering object.

If the loitering time out period has not been reached in connection with the loitering event indicator that received a recent object detected signal, then flowchart 500 loops back to step 506. Once it loops back to step 506, snapshot scheduler 52 waits until the time interval of sampling has elapsed. Once the time interval of sampling has elapsed, snapshot schedule 52 creates a function as a new instance of a serverless function. The new instance of the serverless function retrieves a digital video snapshot from the associated network camera. The new instance of the serverless function can be executed by a new instance of serverless function 54. As described in step 510 and with reference to FIG. 1, object detection module 48 performs object detection on the next sequential digital video snapshot. As described in step 512 and with reference to FIG. 1, a new instance of serverless function 54 is configured to determine whether the digital video snapshot includes an active loitering object by comparing each of the objects detected in the digital video snapshot with the one or more active loitering objects for the digital video stream including the digital video snapshot. If an active loitering object is detected, then block 512 further determines if the location of the object detected that matches the active loitering object intersects with a region of interest active within the digital video stream including the digital video snapshot.

The looped series of steps 506, 508 and 510 and decision 512 are continued until a loitering condition is met. One loitering condition may be that the loitering time out period is reached as depicted in step 518. As another loitering condition, the most recent active loitering object analysis determines that the active loitering object is no longer present. As depicted by the "no" branch of decision block 512, when the analysis determines that the active loitering object is no longer present, then the potential loitering event is closed without transmitting a loitering event signal, as depicted in step 514. The potential loitering event may be closed by transmitting a closing signal to alarm monitoring module 36. This would close the loitering event indicator that may have been previously sent to alarm monitoring module 36.

In one or more embodiments, one of the digital video alarm monitoring parameters used to determine the digital video alarm monitoring mode is a temporal digital video alarm monitoring parameter. Alarm monitoring module 36 may be configured to receive the temporal digital video alarm monitoring parameter from an operator or another user. User computer 38 and/or user mobile device 40 may be configured to receive an input of a temporal digital video alarm monitoring parameter and pass it to alarm monitoring module 36. Active temporal digital video alarm monitoring parameters may be stored in alarm monitoring database 34. Active temporal digital video alarm monitoring parameters may be transmitted to digital video analytics server 18 and stored in digital video database 44.

The temporal digital video alarm monitoring parameter may be an open-ended temporal digital video alarm monitoring parameter or a close-ended temporal digital video alarm monitoring parameter. The open-ended temporal digital video alarm monitoring parameter may be an input received by alarm monitoring module 36 to turn on alarm monitoring (e.g. an arm command) or to turn off alarm monitoring (e.g. a disarm command). The period after the arm command is performed and before the disarm command is performed may be referred to as a supervised period. The period after the disarm command is performed and before the arm command is performed may be referred to as an unsupervised period. In one embodiment, an open-ended temporal digital video alarm monitoring parameter may be input through an app hosted on user mobile device 40. For instance, a night shift worker at a dealership or a retail store may provide a turn on input through user mobile device 40 when leaving the site and a morning shift worker at the dealership or the retail store may provide a turn off input through user mobile device 40 when arriving at the site in the morning.

The closed-ended temporal digital video alarm monitoring parameter may include a start time and an end time, with the period therebetween referring to a supervised period. The closed-ended temporal digital video alarm monitoring parameter may be an input received by alarm monitoring module 36 that includes a recurrence. The recurrence includes a start time and an end time. The recurrence may include a recurrence pattern (e.g. daily, weekly, monthly and yearly) and may include the days of week the start and end times apply. The recurrence may also include a range of recurrence by providing an end by date, or an end after a certain number occurrence. As a non-limiting example, the recurrence may be 7:00 am to 7:00 pm daily without an end date until alarm monitoring module 36 received input to remove the recurrence.

The temporal digital video alarm monitoring parameter may be associated with one or more other digital video alarm monitoring parameters. For instance, the temporal digital video alarm monitoring parameter may be associated with one or more network cameras. As another example, the temporal digital video alarm monitoring parameter may be associated with one or more analytics tags and one or more regions of interest. For instance, a network camera may record a view of a parking lot. The parking lot may have a fence line and a driveway. The temporal digital video alarm monitoring parameter may be associated with the fence line as a region of interest and a human as an analytics tag. The temporal digital video alarm monitoring parameter may not be associated with the driveway because no analytics tags are of interest in resolving the digital video alarm monitoring mode. In one or more embodiments, a closed-ended temporal digital video alarm monitoring parameter may be used to customize an analytics tag and/or region of interest. For instance, a first closed-ended temporal digital video alarm monitoring parameter may be 8:00 am to 8:00 pm and a second closed-ended temporal digital video alarm monitoring parameter may be 8:00 pm to 8:00 am. The first closed-ended temporal digital video alarm monitoring parameter may be associated with a first region of interest (e.g. a parking lot driveway) and the second closed-ended temporal digital video alarm monitoring parameter may be associated with a second region of interest (e.g. a fence line). The first closed-ended temporal digital video alarm monitoring parameter may also be associated with a first analytics tag (e.g. a person) and the second closed-ended temporal digital video alarm monitoring parameter may be associated with a second analytics tag (e.g. an animal).

With reference to FIGS. 1 and 2, gatekeeper server 30 is configured to extract portions of digital video data as set forth in step 106. As described above, the extracted portion may be extracted from a video data header. The video data header may include a unique identifier or name associated with a network camera associated with the digital video clip and/or digital video frames and the time and date when the digital video clip and/or digital video frames were recorded. The video data wrapper may be contained within an email using SMTP protocol. The unique identifier and/or name may be included in a token included in the from, subject, and/or body fields of the email. The time and date may be included within the email. In one embodiment, digital video analytics server 18 is configured to determine whether the digital video alarm monitoring mode is in active monitoring status (e.g. during a supervised period) or inactive monitoring status (e.g. during an unsupervised period) in response to one or more active temporal digital video alarm monitoring parameters and data in the video data header. For instance, if the data in the video data header indicates that the associated digital video data was recorded during of the hours of 7:00 pm and 7:00 am (which is stored in an active temporal digital video alarm monitoring parameter) and the digital video data is from a network camera associated with the active temporal digital video alarm monitoring parameter, then the digital video alarm monitoring mode is the active monitoring status. If the header information indicates that the related video data was recorded outside the hours of 7:00 pm and 7:00 am and/or the recording is not from a network camera associated with an active temporal digital video alarm monitoring parameter, then the digital video alarm monitoring mode is the inactive monitoring status. If the digital video alarm monitoring mode is the active monitoring status, then digital video analytics server 18 performs analysis of digital video data, for instance, as described in connection with step 112 of flowchart 100. In one or more embodiments, the temporal monitoring occurs without configuring the actual digital camera from not sending video clips during certain periods.

With reference to FIGS. 1 and 4, an active monitoring status associated with a digital video clip may be received, as set forth in step 402. As depicted in step 402 of FIG. 4, gatekeeper server 30 receives an active monitoring status associated with one or more digital video clips from alarm monitoring server 22. The active monitoring status indicates that the one or more digital video clips are active. The active monitoring status may further indicate that one or more regions of interest are active on the one or more digital video clips. In one or more embodiments, the one or more regions of interest may be the entire area of the digital video clip or may be one or more portions thereof. The active monitoring status may be further in response to the time and date of the digital video clip and a region of interest being associated with an active temporal digital video alarm monitoring parameter. For instance, the active temporal digital video alarm monitoring parameter may have a period associated with network camera and/or a region of interest. The active monitoring status is determined when not only an active region of interest is determined but also the region of interest is being tracked within a period associated with the region of interest. This feature provides a benefit of further limiting or filtering the digital video clips that are subjected to analysis by digital video analytics server 18. If the temporal filtering results in an active monitoring status, then one or more of the remaining steps of flowchart 400 may be performed.

With reference to FIGS. 1 and 5, a loitering event indicator is determined, as set forth in step 502. Gatekeeper server 30 determines a loitering event indicator associated with a digital video stream. The digital video stream may be associated with one of network cameras 16A to 16N. An operator can select one or more network cameras 16A to 16N activated for loitering detection. Gatekeeper server 30 may be configured to determine a loitering event indicator with a digital video stream by analyzing one or more digital video clips and/or one or more digital video frames. The analysis may indicate the initial stage of a potential loitering event. The initial stage may be a door open or ajar within the digital video stream, a bag appearing within the digital video stream, or a human being appearing within the digital video stream. An operator can select one or more initial stages of a potential loitering event. The determination may further include consideration of active temporal digital video alarm monitoring parameters. For instance, an active temporal digital video alarm monitoring parameter may have a period associated with a network camera and/or a region of interest. The loitering event indicator may be determined when the time and date of the digital video clip from the network camera is within the period of the active temporal digital video alarm monitoring parameter. This feature provides a benefit of further limiting or filtering the digital video clips that are subjected to loitering detection by digital video analytics server 18. If the temporal filtering results in an active monitoring status, then one or more of the remaining steps and/or decision blocks of flowchart 500 may be performed.

Figure 6A:
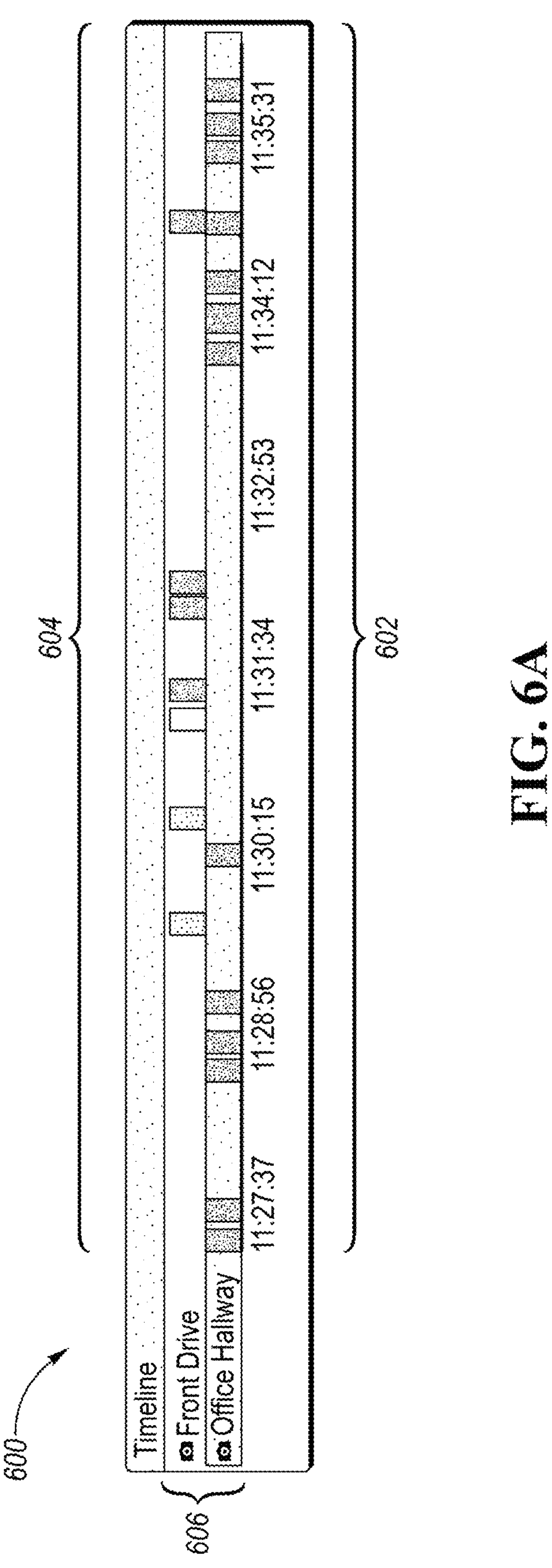
FIG. 6A is a GUI configured to display a chronology of digital video alarm events associated with one or more digital video alarms according to one embodiment.

FIG. 6A is GUI 600 configured to display a chronology of digital video alarm events associated with one or more digital video alarms. Alarm monitoring module 36 may be configured to define an association between digital video alarm events and one or more digital video alarms. The association may be an operator defined association. The association may be related to a group of cameras. For instance, a group of cameras may include camera 1, camera 2 and camera 3. GUI 600 may be configured to display a chronology of digital video alarm events for cameras 1, 2 and 3 when a digital video alarm event is detected from any one of the cameras in the camera group. In one embodiment, when an initial digital video alarm event is detected from a camera, alarm monitoring module 36 is configured to collect data regarding additional alarm events. If any other cameras within the group of cameras have a digital video alarm event, those digital video alarm events will also be displayed on GUI 600. GUI 600 may be updated in real time. For instance, a first digital video alarm event from camera 1 may be displayed on GUI 600. While an operator is viewing the first digital video alarm event, a second digital video alarm event from camera 2 (associated with camera 1) may be displayed on GUI 600. After the second digital video alarm event is displayed on GUI 600, a third digital video alarm event from camera 3 may displayed on GUI 600. GUI 600 may be configured to display multiple digital video alarm events (including digital video clips) received from multiple cameras while handling one digital video alarm. The multiple digital video clips provide situational awareness to an operator addressing the digital video alarm.

Alarm monitoring module 36 may be configured to display GUI 600 through user computer 38 and/or user mobile device 40. GUI 600 includes timeline 602, digital video alarm event icons 604 depicted as rectangles, and network cameras 606, each identified by a camera identifier. As shown in FIG. 6A, network cameras 606 include a front drive camera and an office hallway camera. The network cameras identified in a timeline may be determined based on those network cameras associated with digital video alarm events that relate to a digital video alarm. Alarm monitoring module 36 may automatically determine the relevant cameras in response to the digital video alarm events. In other embodiments, an operator may select the digital video cameras to be associated with a digital video alarm. In one or more embodiments, GUI 600 is beneficial because it is configured to display situational awareness of multiple digital video alarm events associated with one or more digital video alarms.

Timeline 602 is labelled with a time sequence that includes earlier times on the left and later times on the right. The start time of timeline 602 may be based on the time of the first digital video alarm event received by alarm monitoring module 36. GUI 600 displays digital video alarm event icons 604 depicted as rectangles. Each digital video alarm event icon is associated with a digital video alarm event. Alarm monitoring module 36 may be configured to display one or more digital video alarm event icons 604 in response to receiving an alarm signal from digital video analytics server 18. The alarm signal may include information relating to the alarm signal, including digital video clips and digital video alarm event data. As shown in FIG. 6A, digital video alarm event icons 604 are displayed as a function of the network camera associated with the digital video alarm event and the time in which the digital video alarm event occurred. For instance, FIG. 6A displays a digital video alarm event icon 604 at 11:30:15 (HH:MM:SS format) on the office hallway network camera. GUI 600 is configured to permit the operator to hover their cursor over a digital video alarm event icon 604 to display the exact time of the digital video alarm event related to the icon. Digital video alarm event icons 604 may be color coded to provide information to an operator viewing GUI 600. A first color coding may signify that a digital video alarm event has not yet been viewed by an operator through a GUI, such as GUI 600. A second color coding may signify that a digital video alarm event is currently being viewed by an operator through a GUI, such as GUI 600. A third color coding may signify that a digital video alarm event has been viewed by an operator through a GUI, such as a GUI formatted for display by alarm monitoring module 36. A fourth color may signify that multiple events are selected and being viewed at the same time through a GUI, such as a GUI formatted for display by alarm monitoring module 36. In one embodiment, the first, second, third and fourth colors may be green, yellow, gray and blue.

Figure 6B:
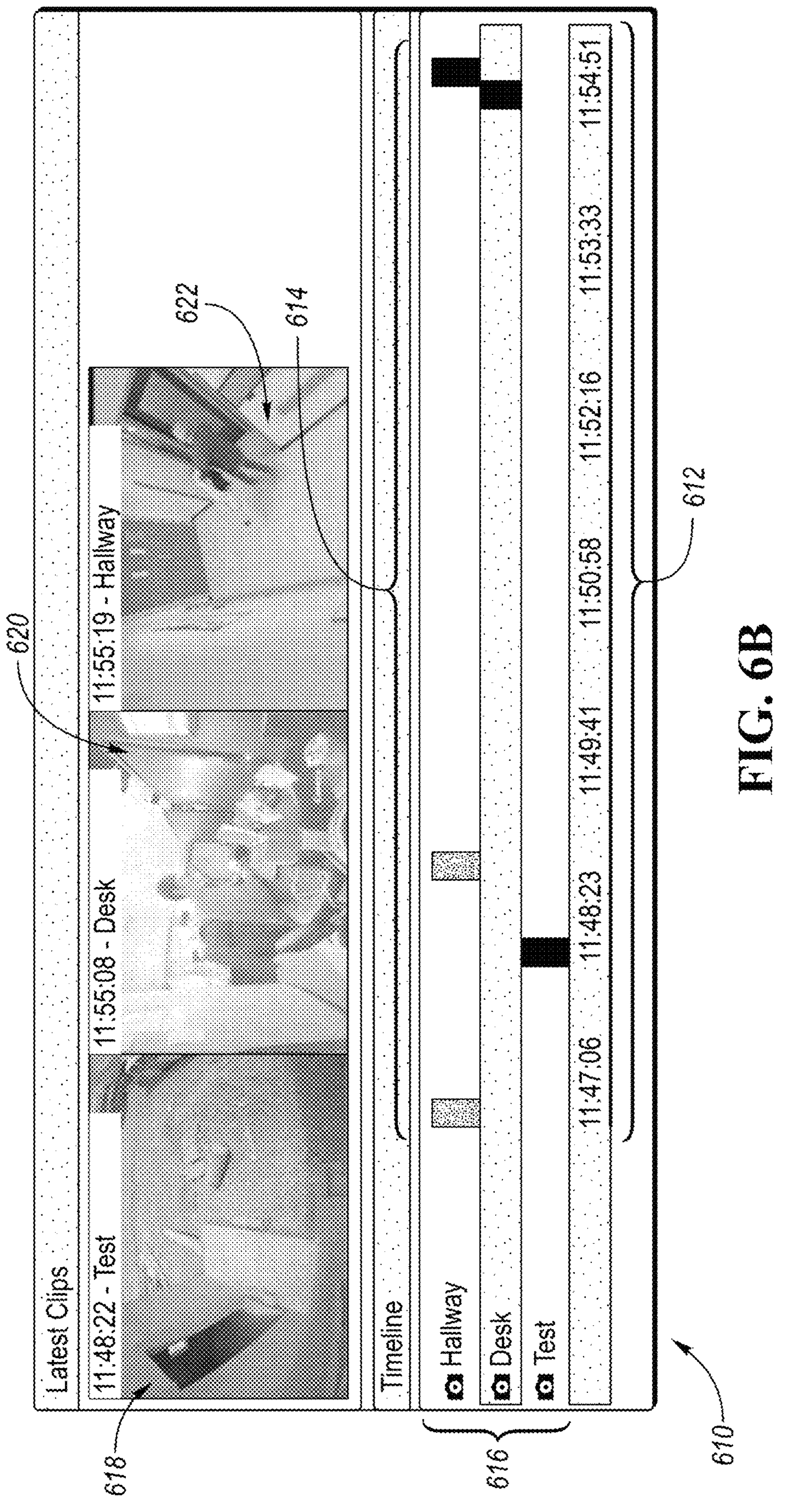
FIG. 6B is a GUI configured to display a number of digital video clips or frames associated with a timeline according to one embodiment.

FIG. 6B is GUI 610 configured to display a number of digital video clips or frames associated with timeline 612. Alarm monitoring module 36 may be configured to display GUI 610 through user computer 38 and/or user mobile device 40. GUI 610 includes timeline 612, digital video alarm event icons 614, and network cameras 616, each identified by a camera identifier. As shown in FIG. 6B, network cameras 616 include Hallway camera, Desk camera, and Test camera. Alarm monitoring module 36 may be configured to display the latest digital video clip from each network camera 616 on GUI 610. As shown in FIG. 6B, GUI 610 displays latest digital video clip 618 from the Test camera, latest digital video clip 620 from the Desk camera, and the latest digital video clip 622 from the Hallway camera. Latest digital video clip 618 from the Test camera displays the time stamp of the digital video clip. The time stamp is displayed in HH:MM:SS format. The time stamp may be the start time of recording the digital video clip. The time stamp of latest digital video clip 618 is 11:48:22. Latest digital video clip 620 from the Desk camera displays the time stamp of 11:55:08. Latest digital video clip 622 from the Hallway camera displays the time stamp of 11:55:19. As shown in FIG. 6B, latest digital video clips 618, 620, and 622 are displayed simultaneously on GUI 610 such that an operator views the clips at the same time. In one or more embodiments, simultaneously refers to two or more digital video clips being played in a user interface at the same time. This configuration allows the operator to efficiently determine a situation relating to the digital alarm events by viewing the latest clips at the same time. The latest digital video clips may be configured to play in a loop through GUI 610. GUI 610 may be configured to receive an input from an operator to pause one or more of the latest video clips to display a digital video frame from the digital video clip. In other embodiments, a digital video frame may be displayed instead of a digital video clip for one or more of the latest clips.

In one embodiment, GUI 610 may be configured to automatically display the latest digital video clip from each camera as it is received by alarm monitoring module 36. Upon receiving a new latest digital video clip from digital video analytics server 18, alarm monitoring module 36 is configured to change the previous latest digital video alarm event icon from the latest icon to the viewed icon. According to this embodiment, GUI 610 may be continuously updated with the latest digital video clips of digital video alarm events for the digital video cameras. If GUI 610 is in a different viewing mode, then an operator can return to the latest clip viewing mode by selecting a view latest clips option through GUI 610.

Figure 6C:
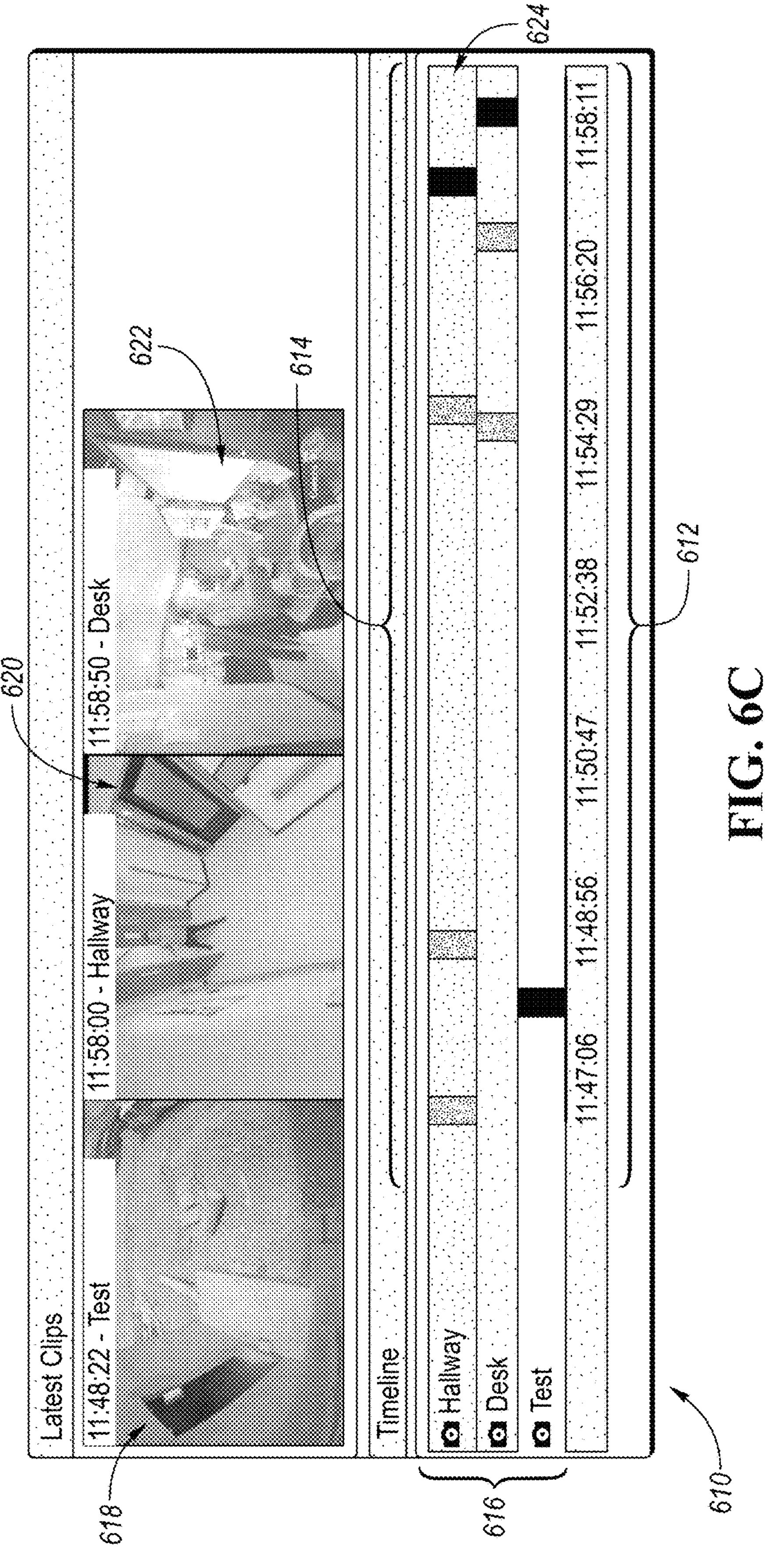
FIG. 6C is a GUI configured to obtain digital video alarm event input according to one embodiment.

FIG. 6C depicts GUI 610 configured to obtain digital video alarm event input 624. GUI 610 may be configured so that each camera line including the camera identifier and the digital video alarm event icons for the camera is selectable by an operator. As shown in FIG. 6C, the Hallway camera line is selected, and the camera line is displayed in a color or shading different than the other camera lines. In one embodiment, the camera shading is light blue. As shown in FIG. 6C, latest digital video clips 618, 620, and 622 are displayed until a camera line is selected and registered by alarm monitoring module 36. Once registered, the digital video clips associated with the digital video events for the selected camera are displayed.

Figure 6D:
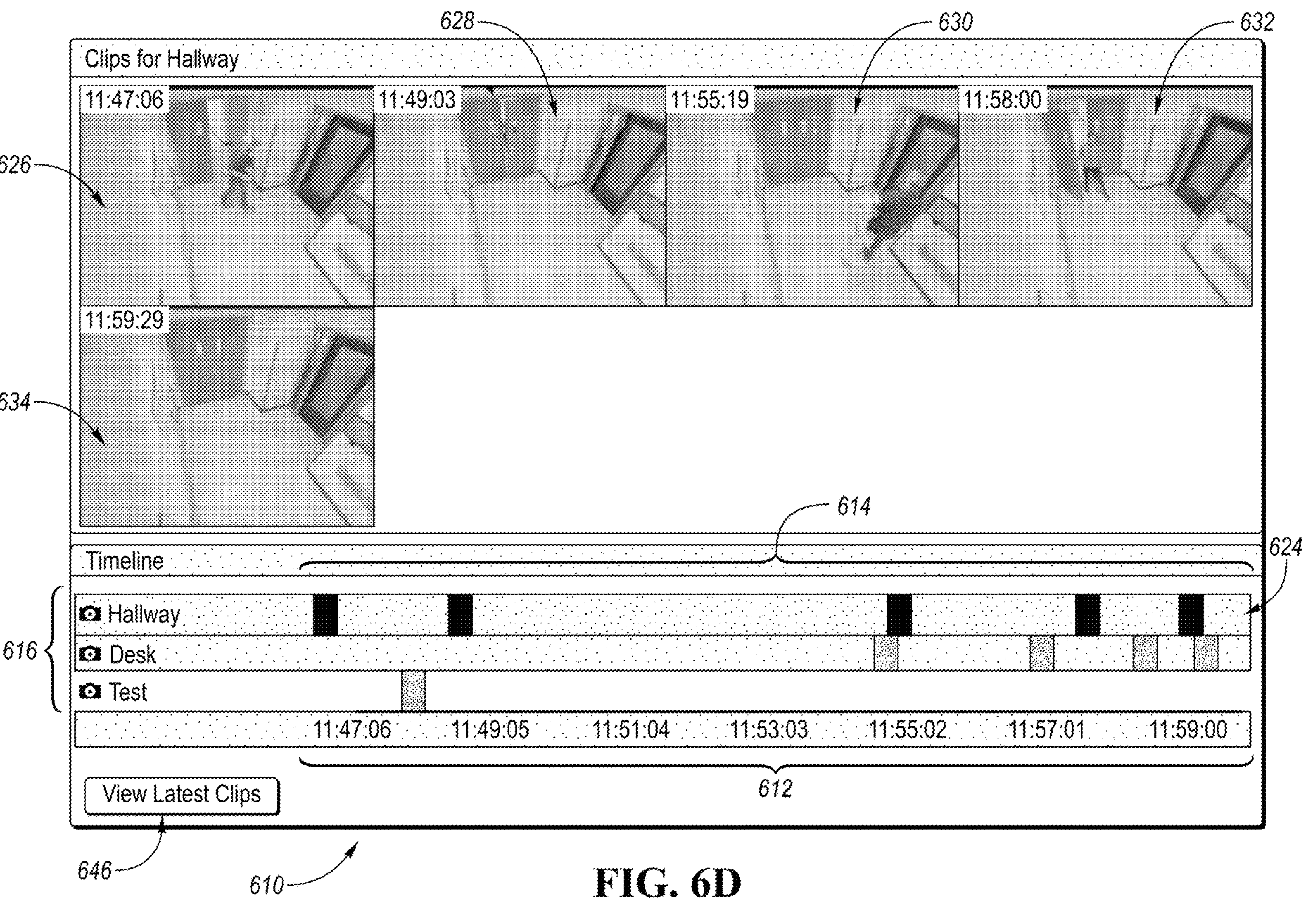
FIG. 6D depicts a GUI configured to display multiple digital video clips associated with digital video events for a selected network camera.

FIG. 6D depicts GUI 610 configured to display multiple digital video clips 626, 628, 630, 632, and 634 associated with digital video events for a selected camera. Digital video clips 626 through 634 are displayed upon multiple digital video alarm event input 624 being received and registered by alarm monitoring module 36. Each of digital video clips 626 through 634 displays the time stamp in HH:MM:SS format. The time stamp may be the start time of recording the digital video clip. Digital video clip 626 is associated with the digital video alarm event signified by the Hallway camera icon at 11:47:06 on timeline 612. Digital video clip 628 is associated with the digital video alarm event signified by the Hallway camera icon at 11:49:03. Digital video clip 630 is associated with the digital video alarm event signified by the Hallway camera icon at 11:55:19. Digital video clip 632 is associated with the digital video alarm event signified by the Hallway camera icon at 11:58:00. Digital video clip 634 is associated with the digital video alarm event signified by the Hallway camera icon at 11:59:29.

As shown in FIG. 6D, digital video clips 626 through 634 are displayed simultaneously on GUI 610 such that an operator views the clips at the same time. In one or more embodiments, simultaneously refers to two or more digital video clips being played in a user interface at the same time so that the playback overlaps an overlapping period for the two or more digital video clips. The overlapping period may be any of the following values or in a range of any two of the following values: 50%, 70%, 80%, 90%, 95%, 99% and 100% of the duration of the two or more digital video clips. In one or more embodiments, only the digital video clips associated the digital video alarm events are displayed. Digital video clips that may have been analyzed by digital video analytics server 18 but are not associated with digital video alarm events are not displayed through GUI 610. GUI 610 is configured for viewing of a non-consecutive sequence of digital video clips filtered for display on whether a digital alarm event is associated with the digital video clip. In one or more embodiments, non-consecutive refers to a time gap between the end time of the first clip and the start time of the second clip. This configuration allows the operator to efficiently determine a situation related to a digital video alarm by only viewing digital video clips associated with digital video alarm events related to the digital video alarm. Otherwise, the operator would be required to view a significant number of digital video clips not associated with the digital alarm event. Instead, the operator only views the digital video clips most pertinent to the digital video alarm event related to the digital video alarm. Simultaneously viewing multiple digital video clips from a network camera over a timeline provides an operator a broader sense of what is occurring on-site while handling digital video alarms. The camera digital video clips may be configured to play in a loop through GUI 610. GUI 610 may be configured to receive an input from an operator to pause one or more of the latest video clips to display a digital video frame for the digital video clip. In other embodiments, a digital video frame may be displayed instead of a digital video clip for one or more of the network cameras.

Figure 6E:
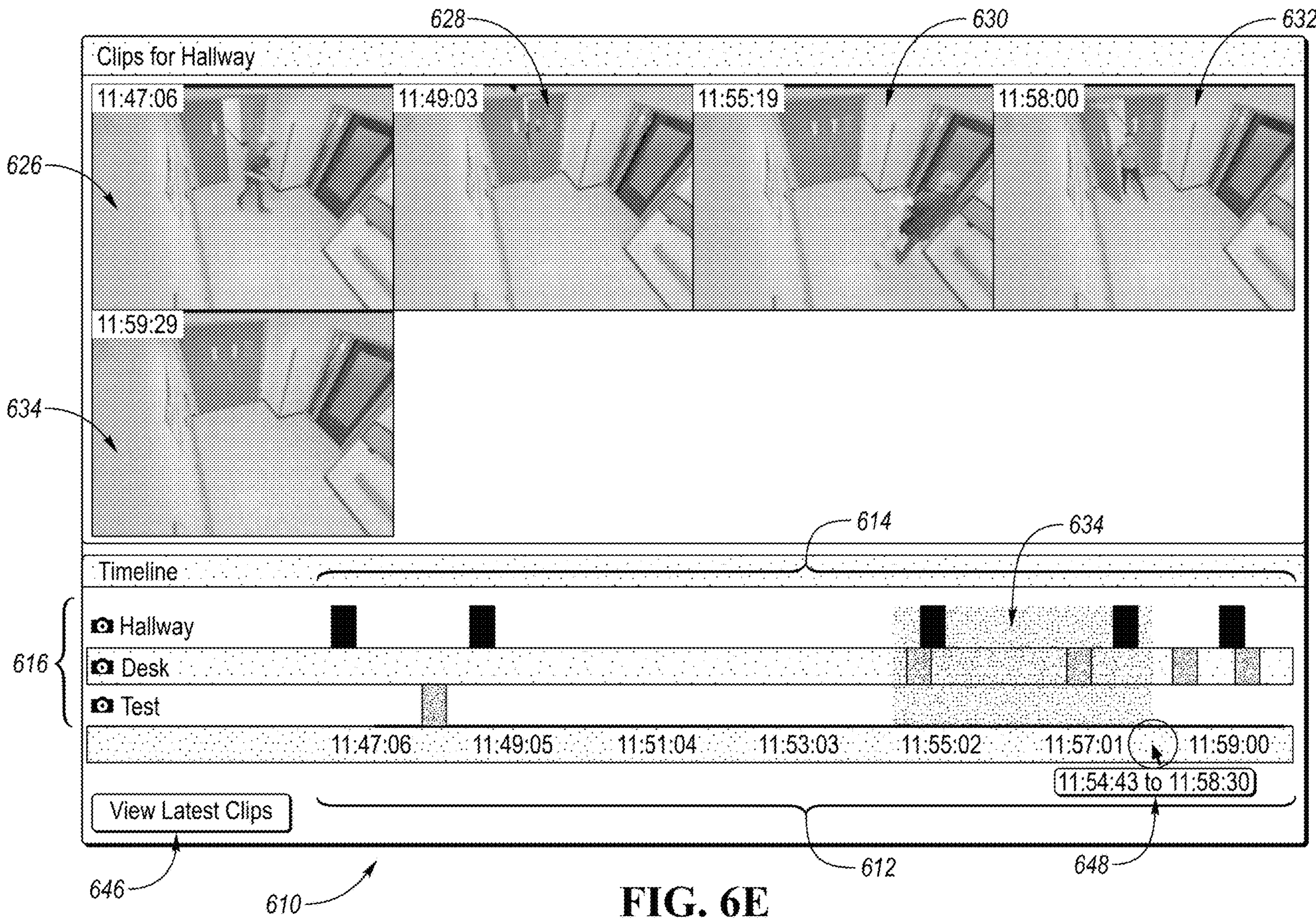
FIG. 6E depicts a GUI configured to obtain digital video alarm event input according to one embodiment.

FIG. 6E depicts GUI 610 configured to obtain digital video alarm event input 636. GUI 610 may be configured to receive click and drag inputs as multiple digital video alarm event input 636. As shown on FIG. 6E, GUI 610 is configured to accept a click input to anchor a corner of the bounding box that represents digital video alarm event input 636 and then a drag input discontinued on a diagonal corner of the bounding box to form the bounding box. For instance, the click operation may be performed on the lower left hand corner of digital video alarm event input 636 and the drag operation can be discontinued on upper right hand corner of digital video alarm event input 636. In another embodiment, the click operation may be performed on a lower corner of digital video alarm event input 636 and the drag operation only registers the x-axis movement away from the lower corner. In this embodiment, all digital video alarm event icons from all cameras displayed on GUI 610 are selected. Digital video alarm input 636 may be a shade or color different than the rest of timeline 612. Digital video alarm input 636 may be a color or shade different from digital video alarm event input 624. In one embodiment, the color of digital video alarm input 636 is light purple. As shown on FIG. 6E, camera digital video clips 626, 628, 630, 632, and 634 are displayed until digital video alarm input 634 is selected and registered by alarm monitoring module 36. Once registered, the digital video clips associated with digital video alarm input 636 are displayed. As shown in FIG. 6E, the bounding box can select digital video alarm event icons 614 from two or more network cameras 616. In one or more embodiments, the bounding box can select digital video alarm event icons 614 from less than all the camera displayed on GUI 610. In yet other embodiments, the bounding box can select digital video alarm event icons 614 from all the cameras displayed on GUI 610. As shown in FIG. 6E, the bounding box is labelled with label 648 showing the associated start time and end of the bounding box.

Figure 6F:
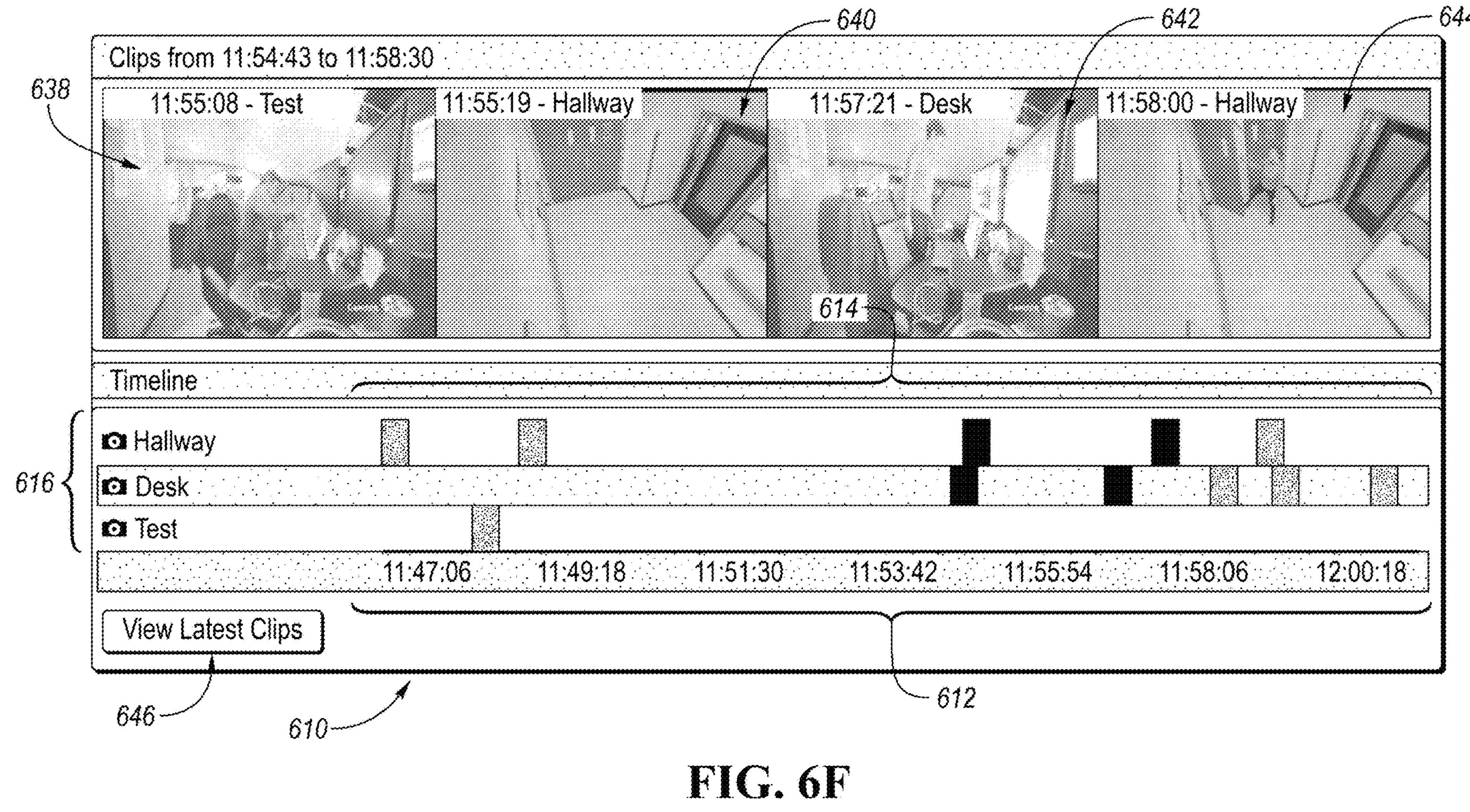
FIG. 6F depicts a GUI configured to display digital video clips associated with digital video alarm event icons within digital video alarm event input according to one embodiment.

FIG. 6F depicts GUI 610 configured to display digital video clips 638, 640, 642, and 644 associated with the digital video alarm event icons within digital video alarm event input 636. As shown in FIG. 6F, the digital video clips are displayed left to right (and could go onto multiple lines as depicted in FIG. 6E) in a time sequence from earliest to latest. Only the digital video clips associated with digital video alarm events within the time sequence are displayed. Digital video clips that may have been analyzed by digital video analytics server 18 but are not associated with digital video alarm events are not displayed through GUI 610. GUI 610 is configured for viewing of a non-consecutive sequence of digital video clips filtered for display on whether a digital alarm event is associated with the digital video clip. In one or more embodiments, non-consecutive refers to a time gap between the end time of the first clip and the start time of the second clip. This configuration allows the operator to efficiently determine a situation related to a digital video alarm by only viewing digital video clips associated with digital video alarm events related to the digital video alarm. Otherwise, the operator would be required to view a significant number of digital video clips not associated with the digital alarm event. Instead, the operator only views the digital video clips associated with the user-selected bounding box, which includes multiple cameras. Simultaneously viewing of multiple digital video clips from multiple network cameras over a timeline provides an operator a broader sense of what is occurring on-site while handling digital video alarms. The digital video clips may be configured to play in a loop through GUI 610. GUI 610 may be configured to receive an input from an operator to pause one or more of the latest video clips to display a digital video frame for the digital video clip. In other embodiments, a digital video frame may be displayed instead of a digital video clip for one or more of the camera clips.

FIG. 6F also includes view latest clips option 646. Upon selecting latest clips option 646, GUI 610 changes from multiple camera timeline mode as depicted, for instance, by FIGS. 6E and 6F to view latest clip mode as depicted, for instance, by FIG. 6B. As depicted in FIG. 6D, view latest clips option 646 may be selected to change from camera multiple event mode as depicted, for instance, by FIGS. 6C and 6D, to view latest clip mode as depicted, for instance, by FIG. 6B. In one or more embodiments, GUI 610 may be configured to toggle between multiple camera timeline mode to camera multiple event mode. By GUI 610 being configured to be toggled between view latest clip mode, multiple camera timeline mode and camera multiple event mode, GUI 610 beneficially permits viewing of digital video clips from different modes quickly and efficiently to determine a scenario relating to the digital video alarm events. GUI 610 is configured so that a digital video clip may be selected to show analytics data associated with the clip. The analytics data may include object detection data and/or motion detection data.

Figure 7A:
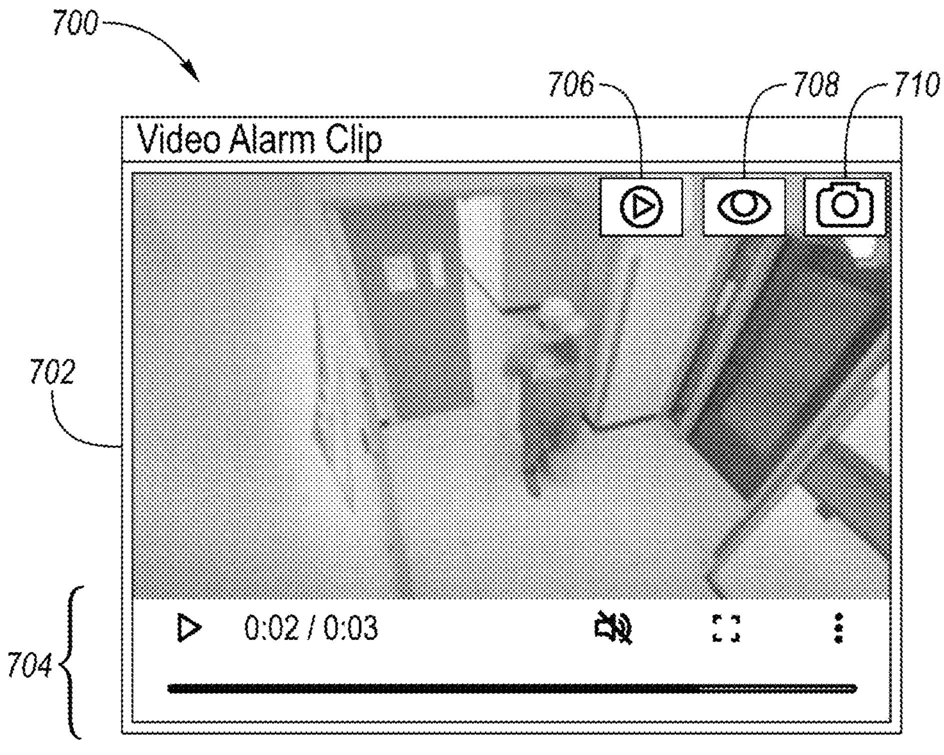
FIG. 7A depicts a GUI displaying a digital video clip associated with a digital video alarm event icon.

As shown in FIG. 6A, timeline 602 includes several digital video alarm event icons 604 for network cameras 606 (i.e. front drive network camera and office hallway network camera). Digital video alarm event icons 604 are configured to be selectable by an operator. In one embodiment, upon selecting a digital video alarm event icon 604, the digital video clip associated with the digital video alarm event icon is displayed. FIG. 7A depicts GUI 700 displaying digital video clip 702 associated with a digital video alarm event icon. Alarm monitoring module 36 may be configured to format and display GUI 700. GUI 700 includes playback controls 704 configured to permit an operator to interact with digital video clip 702. Playback controls 704 include a slider bar configured to move back and forth between individual digital video frames within digital video clip 702. Playback controls 704 include a play and pause button configured to play and pause digital video clip 702. Play controls 704 include an audio toggle button to toggle between mute and volume of the digital video clip 702 and to adjust the volume of digital video clip 702 when the volume toggle is selected. Playback controls 704 include an entire screen button to enlarge or diminish the size of digital video clip 702 on a display screen. Playback controls 704 may also include additional features or functions selectable by an operator. Playback controls 704 are configured to permit an operator to precisely manipulate digital video clip 702 to capture a specific digital video frame with digital video clip 702.

GUI 700 also includes live view option selectable by icon 706, analytics option selectable by icon 708 and capture option selectable by icon 710. The live view option is configured to update GUI 700 with a live streaming feed of the network camera originating digital video clip 702. The analytics option is configured to manage the analytics data (e.g. motion and/or object detection data) on digital video clip 702. FIGS. 3K through 3U and the related description further details the management of analytics data using the analytics option. The capture option is configured to capture and to store the current digital video frame displayed from digital video clip 702. The capture option is configured to allow an operator to select an exact digital video frame from digital video clip 702. The exact digital video frame may be indicative of the digital video alarm event being displayed through digital video clip 702.

Alarm monitoring module 36 may be configured to generate an electronic report of digital video alarm events associated with a digital video alarm. Alarm monitoring module 36 is configured to associate the selected digital video frame of a digital video clip for a digital video alarm event such that the digital video frame is included in the electronic report. The digital video frame may be selected to identify a potential perpetrator or an object of interest.

In one or more embodiments, the digital video frame may be associated in the electronic document with a digital video clip hyperlink. In one or more embodiments, the digital video clip hyperlink is a pre-authenticated, functional uniform resource locator ("URL"). The URL may be configured to automatically retrieve the digital video clip from a web-based portal (e.g. alarm monitoring module 36) with access to a database (e.g. alarm monitoring server 22). The automatic retrieval may occur without the user completing a login screen. The URL may include authentication information for the web-based portal and identifying information for identifying the digital video clip. The authentication information and/or identifying information may be included in a token representing the authentication information and/or identifying information in an encoded form. In another embodiment, the token represents the identifying information in an encoded form. The authentication information may be information identifying the web-based portal and/or a login credential. The identifying information may be a unique identifier of the specific digital video clip. The identifying information may be used to differentiate and retrieve the specific digital video clip. The token itself may be a unique identifier that serves the dual functions of authenticating and facilitating retrieval of the specific digital video clip. In this way, in one or more embodiments, the digital video clip is a pre-authenticated, functional URL.

In one or more embodiments, the electronic document does not embed the actual digital video clip. Instead, an icon of the associated digital video frame is included in the electronic document along with the digital video clip hyperlink, which may be activated by a user selecting the digital video frame. Upon selecting one of the digital video frames, the associated digital video clip hyperlink is activated, which allows the digital video clip to be displayed and played for a user. In one or more embodiments, the digital video clip is downloaded and saved to a user's computer. In one or more embodiments, a ser can open the digital video clip and play it using a user computer video player. The digital video clip hyperlink may be embedded in the electronic document such that it is not viewable in the electronic document without looking at the source content of the electronic document. The electronic document may also include other information relating to each digital video alarm event. By not embedding the actual digital video clip into the electronic document, less storage space is utilized and it takes less computing power to send the electronic document through a network (e.g. via email).

The electronic document may be in any suitable format to include electronic media content, including a portable document format (PDF). When the electronic document is a PDF, the associated digital video clip hyperlink is activated, which allows the digital video clip to be displayed and played for a user using standard PDF player software.

FIG. 7B depicts electronic report 712 associated with several digital video alarm events. Electronic report 712 includes information regarding the account, site time and alarm details. Electronic report 712 includes a row for each digital video alarm event. Each row includes a site time of the digital video alarm event, details of the digital video alarm event and a digital video frame for the digital video alarm event. First, second and third digital video alarm events are shown on electronic report 712. First digital alarm event includes first digital video frame icon 714. First digital video frame icon 714 is associated with a first digital video clip associated with the first digital video alarm event through a first digital video clip hyperlink. Second digital alarm event includes second digital video frame icon 716. Second digital video frame icon 716 is associated with a second digital video clip associated with the second digital video alarm event through a second digital video clip hyperlink. Third digital alarm event includes third digital video frame icon 718. Third digital video frame icon 718 is associated with the third digital video clip associated with the third digital video alarm event through a third digital video clip hyperlink. First, second and third digital video frame icons 714, 716, and 718 are configured to be selectable to play the linked first, second and third digital video clips, respectively.

Figure 7C:
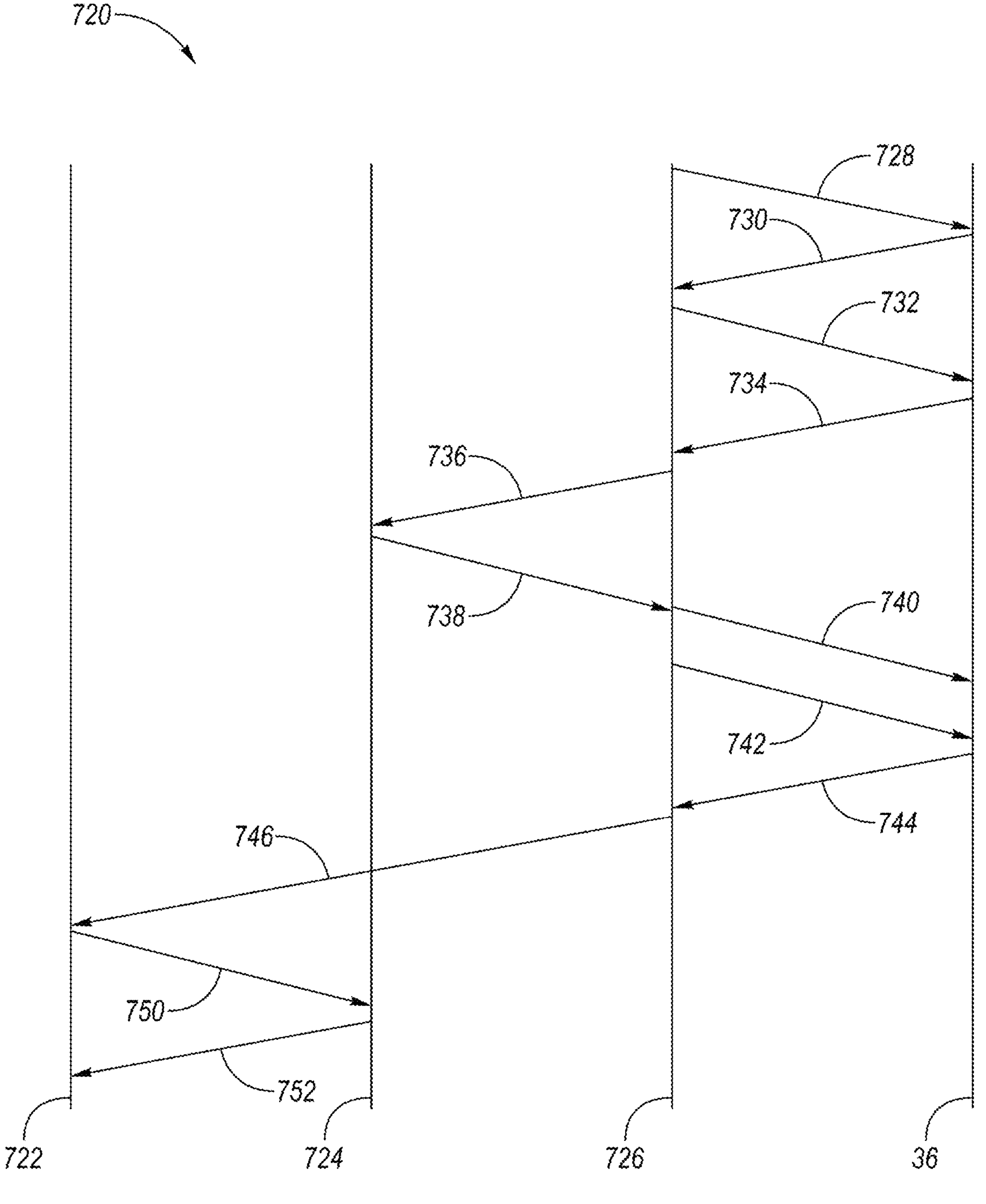
FIG. 7C depicts a sequence diagram of a process executed by alarm monitoring module to implement the use of a hyperlinked digital video alarm clip electronic document according to one embodiment.

FIG. 7C depicts a sequence diagram of a process 720 that may be executed by alarm monitoring module 36 to implement the use of a hyperlinked digital video alarm clip electronic document. As shown in FIG. 7C, the environment of process 720 includes viewer user device 722, database 724, operator device 726, and alarm monitoring module 36.

As shown by arrow 728, operator device 726 transmits a digital video clips request command to alarm monitoring module 36. Non-limiting examples of operator device 726 include user computer 38 and user mobile device 40. The digital video clips request command is configured to request a list of digital video clips available for a digital video alarm report. As shown by arrow 728, the digital video clips request command is received by alarm monitoring module 36.

As shown by arrow 730, alarm monitoring module 36 transmits a list of digital video clips to operator device 726. The list of digital video clips may be a list of digital video clips available for a digital video alarm report. As shown by arrow 730, the digital video clips are received by operator device 726.

As shown by arrow 732, operator device 726 transmits a get digital video clip hyperlink command to alarm monitoring module 36. The command may be executed for one or more digital video clips. The hyperlink may be a URL, when selected, accesses a digital video clip. The URL may include authentication information for a web-based portal configured to access a database housing the digital video clip and identifying information for identifying the digital video clip. The authentication information and/or identifying information may be included in a token or may be included with a token representing the authentication information and/or identifying information in an encoded form. In another embodiment, the token represents the identifying information in an encoded form. The authentication information may be information identifying the web-based portal and/or a login credential. The identifying information may be a unique identifier of the specific digital video clip. The identifying information may be used to differentiate and retrieve the specific digital video clip. The token itself may be a unique identifier that serves the dual functions of authenticating and facilitating retrieval of the specific digital video clip. In this way, in one or more embodiments, the digital video clip is a pre-authenticated, functional URL. As shown by arrow 732, the get digital video clip hyperlink command is received by alarm monitoring module 36.

As shown by arrow 734, alarm monitoring module 36 transmits the digital video clip hyperlink command to operator device 726. The command may be executed for one or more digital video clip hyperlinks. In one embodiment, alarm monitoring module 36 transmits a digital video clip hyperlink for each digital video clip included in a get digital video clip hyperlink command. As shown by arrow 734, each digital video clip hyperlink is received by operator device 726.

As shown by arrow 736, operator device 726 transmits a hyperlink token request command to database 724. Non-limiting examples of database 724 include alarm monitoring database 34 and digital video database 44. The hyperlink token request command requests digital video database 44 to create a hyperlink with a token.

As shown by arrow 738, the hyperlink with a token is transmitted from database 724 to operator device 726. Operator device 726 is configured to receive the hyperlink.

As shown by arrow 740, operator device 726 is configured to transmit a tag digital video clip command to alarm monitoring module 36. In one or more embodiments, one or more digital video clips may be tagged for inclusion in a digital video alarm clip electronic document by repeating steps 728 through 738. The tag may be a field in a database associated with the digital video clip and/or the digital video clip hyperlink.

As shown by arrow 742, operator device 726 is configured to transmit a digital video alarm clip electronic document build request command to alarm monitoring module 36. Upon receiving the digital video alarm clip electronic document build request command from operator device 726, alarm monitoring module 36 may be configured to build the digital video alarm clip electronic document. In one or more embodiments, the electronic document includes information associated with one or more digital video alarm events. The information included for each digital video alarm event may include a site time for the digital video alarm event, details of the digital video alarm event and a digital video frame for the digital video alarm event. The electronic document also includes a hyperlink (e.g. an authenticate, tokenized hyperlink) for each digital video alarm event. The hyperlink may be embedded in the electronic document such that it is not visible to the user of the electronic document. The hyperlink may be linked to the digital video frame such that the digital video frame is selectable to activate the hyperlink. Alarm monitoring module 36 may be configured to build an electronic document including all digital video clips marked as tagged.

As shown by arrow 744, the digital video alarm event electronic document is transmitted by alarm monitoring module 36 to operator device 726. Operator device 726 may be configured to display the digital video alarm event electronic document. The display of the digital video alarm event electronic document may be utilized by an operator to review and verify the contents of the digital video alarm event electronic document.

The digital video alarm event electronic document may also be transmitted from operator device 726 to viewer user device 722, as depicted by arrow 746. Non-limiting examples of viewer user device 722 include user computer 38 and user mobile device 40. Viewer user device 722 may be configured to display the digital video alarm event electronic document.

As depicted by arrow 750, viewer user device 722 receives an input indicative of the activation of a digital video alarm event hyperlink. A user may activate the digital video alarm event hyperlink by selecting the associated digital video frame. Upon receiving the input, viewer user device 722 may be configured to transmit the digital video alarm event hyperlink to database 724, as depicted by arrow 750.

As depicted by arrow 752, a processor associated with database 724 retrieves a digital video clip associated with the digital video alarm event hyperlink and transmits the digital video clip to viewer user device 722. In one or more embodiments, the digital video clip is transmitted for viewing in response to confirming the authenticity of the request through the hyperlink. Viewer user device 722 is configured to display the digital video clip within the software configured to view the associated electronic document. For instance, when the electronic document is a PDF, the digital video clip may be displayed and played using standard PDF player software.

The following applications are related to the present application: U.S. patent application Ser. No. 17/232,247, filed on Apr. 16, 2021, and issued as U.S. Pat. No. 11,790,764 on Oct. 17, 2023, U.S. patent application Ser. No. 17/232,261, and issued as U.S. Pat. No. 12,361,805 on Jul. 15, 2025, filed on Apr. 16, 2021, U.S. patent application Ser. No. 17/232,266, filed on Apr. 16, 2021, and issued as U.S. Pat. No. 11,688,273 on Jun. 27, 2023, U.S. patent application Ser. No. 17/232,284, filed on Apr. 16, 2021, and issued as U.S. Pat. No. 12,307,878 on May 20, 2025, U.S. patent application Ser. No. 17/232,296, filed on Apr. 16, 2021, U.S. patent application Ser. No. 17/675,673, filed on Feb. 18, 2022, and issued as U.S. Pat. No. 11,887,448 on Jan. 30, 2024, and U.S. patent application Ser. No. 17/876,062, filed on Jul. 28, 2022, which are each incorporated by reference in their entirety herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Any combination of computer-readable media may be utilized to implement the systems and processes of any embodiment disclosed herein. Computer-readable media may be a computer-readable signal medium and/or a computer-readable storage medium. A computer-readable storage medium may include any suitable tangible medium that can contain or store a program for use by or in connection with an instruction execution system, apparatus, or device. A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device. Program code embodied on a computer-readable medium may be transmitted using any appropriate medium, including but not limited to wireless, optical fiber cable, RF, and/or the like, and/or any suitable combinations thereof. Computer program code for carrying out operations for aspects of the systems described herein may be written in one or any combination of programming language such as Java, Smalltalk, C++, and conventional procedural programming languages, such as C. Mobile apps may be developed using any suitable language, including those previously mentioned, as well as Objective-C, Swift, c#, and HTML5.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A digital video alarm situational monitoring computer system including an alarm monitoring computer having non-transitory memory configured to store machine instructions that are to be executed by the computer, the machine instructions when executed by the computer implement the following functions:

receiving a first digital video clip associated with a first digital video alarm event and a second digital video clip associated with a second digital video alarm event, the first digital video clip being recorded by a first network digital video camera, and the second digital video clip being recorded by a second network digital video camera different than the first network digital video camera;

displaying a first icon of the first digital video alarm event associated with a first timeline and having a first color coding and a second icon of the second digital video alarm event associated with a second timeline different than the first timeline and having a second color coding different than the first color coding on a graphical user interface, the first timeline associated with the first network digital video camera, the second timeline associated with the second network digital video camera, the first color coding signifies that the first digital video alarm event has not yet been viewed, and the second color coding signifies that the second digital video alarm event has been viewed;

receiving a single camera input selecting both of the first and second icons simultaneously from a bounding box bounding the first and second icons and spanning the first and second timelines by a click input to anchor a corner of the bounding box and a drag input discontinued on a diagonal corner of the bounding box to form the bounding box; and playing the first digital video clip and the second digital video clip on the graphical user interface in response to receiving the single camera input.

2. The digital video alarm situational monitoring computer system of claim 1, wherein the first digital video clip has a first start time and a first end time and the second digital video clip has a second start time and a second end time, the first and second digital video clips form a non-consecutive sequence such that the second start time is later in time than the first end time.

3. The digital video alarm situational monitoring computer system of claim 1, wherein the first icon has a first designation and the second icon has a second designation, and the machine instructions when executed by the computer implement the following further function: changing the first designation from an unviewed designation to a viewed designation and the second designation from the unviewed designation to the viewed designation.

4. The digital video alarm situational monitoring computer system of claim 1, wherein the machine instructions when executed by the computer implement the following further function: receiving a digital video selection input of one of the first or second digital video clips and displaying analytics data of the first or second digital video clip associated with the digital video selection input.

5. The digital video alarm situational monitoring computer system of claim 1, wherein the receiving the single camera input function includes highlighting the first and second icons.

6. The digital video alarm situational monitoring computer system of claim 1, wherein the first and second digital video alarm events are associated with a digital video alarm.

7. The digital video alarm situational monitoring computer system of claim 1, wherein the playing the first digital video clip and the second digital video clip function includes looping the first and second digital video clips.

8. A digital video alarm situational monitoring computer system including an alarm monitoring computer having non-transitory memory configured to store machine instructions that are to be executed by the computer, the machine instructions when executed by the computer implement the following functions:

receiving a first digital video clip associated with a first digital video alarm event and a second digital video clip associated with a second digital video alarm event, the first digital video clip being recorded by a first network digital video camera, and the second digital video clip being recorded by a second network digital video camera different than the first network digital video camera;

displaying a first icon of the first digital video alarm event associated with a first timeline and having a first color coding and a second icon of the second digital video alarm event associated with a second timeline different than the first timeline and having a second color coding different than the first color coding on a graphical user interface, the first timeline associated with the first network digital video camera, the second timeline associated with the second network digital video camera, the first color coding signifies that the first digital video alarm event has not yet been viewed, and the second color coding signifies that the second digital video alarm event has been viewed;

receiving a single timeline input selecting both of the first and second icons simultaneously from a bounding box bounding the first and second icons and spanning the first and second timelines; and simultaneously playing the first digital video clip and the second digital video clip on the graphical user interface in response to receiving the single timeline input.

9. The digital video alarm situational monitoring computer system of claim 8, wherein the first digital video clip has a first start time and a first end time and the second digital video clip has a second start time and a second end time, the playing function includes displaying the first and second digital video clips in a chronological order in response to the first start and end times and the second start and end times.

10. The digital video alarm situational monitoring computer system of claim 8, wherein the first icon has a first designation and the second icon has a second designation, and the machine instructions when executed by the computer implement the following further function: changing the first designation from an unviewed designation to a viewed designation and the second designation from the unviewed designation to the viewed designation.

11. The digital video alarm situational monitoring computer system of claim 8, wherein the machine instructions when executed by the computer implement the following further function: receiving a digital video selection input of one of the first or second digital video clips and displaying analytics data of the first or second digital video clip associated with the digital video selection input.

12. The digital video alarm situational monitoring computer system of claim 8, wherein the receiving the single camera input function includes highlighting the first and second icons.

13. The digital video alarm situational monitoring computer system of claim 8, wherein the receiving the single camera input function includes displaying a start time and end time associated with the single timeline input.

14. A method comprising:

receiving a first digital video clip associated with a first digital video alarm event and a second digital video clip associated with a second digital video alarm event, the first digital video clip being recorded by a first network digital video camera, and the second digital video clip being recorded by a second network digital video camera different than the first network digital video camera;

displaying a first icon of the first digital video alarm event associated with a first timeline and having a first color coding and a second icon of the second digital video alarm event associated with a second timeline and having a second color coding different than the first color coding on a graphical user interface, the first timeline associated with the first network digital video camera, and the second timeline associated with the second network digital video camera, the first color coding signifies that the first digital video alarm event has not yet been viewed, and the second color coding signifies that the second digital video alarm event has been viewed;

receiving a single camera input selecting both of the first and second icons simultaneously from a bounding box bounding the first and second icons and spanning the first and second timelines by a click input to anchor a corner of the bounding box and a drag input discontinued on a diagonal corner of the bounding box to form the bounding box; and playing the first digital video clip and the second digital video clip on the graphical user interface in response to receiving the single camera input.

15. The method of claim 14, wherein the first digital video clip has a first start time and a first end time and the second digital video clip has a second start time and a second end time, the first and second digital video clips form a non-consecutive sequence such that the second start time is later in time than the first end time.

16. The method of claim 14, wherein the first icon has a first designation and the second icon has a second designation, and further comprising changing the first designation from an unviewed designation to a viewed designation and the second designation from the unviewed designation to the viewed designation.

17. The method of claim 14, further comprising receiving a digital video selection input of one of the first or second digital video clips and displaying analytics data of the first or second digital video clip associated with the digital video selection input.

18. The method of claim 14, wherein the receiving the single camera input step includes highlighting the first and second icons.

19. The method of claim 14, wherein the first and second digital video alarm events are associated with a digital video alarm.

20. The method of claim 14, wherein the playing the first digital video clip and the second digital video clip function includes looping the first and second digital video clips.

* * * * *